(12) United States Patent
Ishihara

(10) Patent No.: US 10,681,616 B2
(45) Date of Patent: Jun. 9, 2020

(54) WIRELESS COMMUNICATION DEVICE, WIRELESS COMMUNICATION METHOD, COMPUTER DEVICE, AND INFORMATION PROCESSING METHOD

(71) Applicant: TOSHIBA MEMORY CORPORATION, Minato-ku (JP)

(72) Inventor: Takeshi Ishihara, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 121 days.

(21) Appl. No.: 15/697,903

(22) Filed: Sep. 7, 2017

(65) Prior Publication Data
US 2018/0279206 A1 Sep. 27, 2018

(30) Foreign Application Priority Data
Mar. 21, 2017 (JP) ................... 2017-055072

(51) Int. Cl.
| | | |
|---|---|---|
| H04W 48/08 | (2009.01) | |
| H04L 29/12 | (2006.01) | |
| H04W 72/04 | (2009.01) | |
| G06F 9/455 | (2018.01) | |

(Continued)

(52) U.S. Cl.
CPC ........ *H04W 48/08* (2013.01); *G06F 9/45558* (2013.01); *H04L 61/10* (2013.01); *H04L 61/2038* (2013.01); *H04W 72/0406* (2013.01); *G06F 2009/45595* (2013.01);

(Continued)

(58) Field of Classification Search
None
See application file for complete search history.

(56) References Cited

U.S. PATENT DOCUMENTS

| 8,645,605 B2 | 2/2014 | Subramaniyan et al. |
| 8,918,568 B2 | 12/2014 | Ayzenfeld et al. |

(Continued)

OTHER PUBLICATIONS

Lei Xia et al. "Virtual WiFi: Bring Virtualization from Wired to Wireless", VEE 11 Proceedings of the 7th ACM SIGPLAN/SIGOPS International Conference on virtual execution environments, 2011, 12 pages.

*Primary Examiner* — Saumit Shah
(74) *Attorney, Agent, or Firm* — Oblon, McClelland, Maier & Neustadt, L.L.P.

(57) ABSTRACT

According to one embodiment, a wireless communication device includes a wireless-communication interface and a wireless-network-information controller. The wireless-communication interface is configured to communicate with one or more terminal using a wireless network. The wireless-network-information controller is configured to receive, a request for wireless network information which is information based on wireless communication with the terminal from a virtual machine operating on a virtual computing environment executed in a processor or a container operating on a container environment executed in the processor, and configured to acquire the wireless network information using the wireless-communication interface based on the request or configured to read out the wireless network information from information given in advance, and transmits the wireless network information to the virtual machine or the container.

17 Claims, 15 Drawing Sheets

(51) Int. Cl.
*H04W 8/26* (2009.01)
*H04W 88/04* (2009.01)

(52) U.S. Cl.
CPC ........... *H04L 61/6022* (2013.01); *H04W 8/26* (2013.01); *H04W 88/04* (2013.01)

(56) References Cited

U.S. PATENT DOCUMENTS

| | | | |
|---|---|---|---|
| 2014/0033288 A1* | 1/2014 | Wynn | H04W 12/08 726/7 |
| 2014/0219104 A1* | 8/2014 | Senarath | H04L 41/0896 370/238 |
| 2016/0054953 A1 | 2/2016 | Lee et al. | |
| 2016/0073441 A1* | 3/2016 | Faccin | H04W 48/00 370/329 |
| 2018/0181425 A1* | 6/2018 | Kim | G06F 9/45558 |
| 2018/0183764 A1* | 6/2018 | Gunda | G06F 21/50 |

* cited by examiner

| REQUEST SOURCE ID | INFORMATION ID | ACTION | ADDITIONAL CONDITION | EXECUTION PERMISSION |
|---|---|---|---|---|
| VFID_01 | INFO_01(RSSI) | ACT_01(GET) | ADDINFO_MAC(ADDR01) | OK |
| VFID_01 | INFO_02(AoA) | ACT_01(GET) | ADDINFO_MAC(ADDR01) | OK |
| VFID_01 | ⋮ | ⋮ | ⋮ | ⋮ |
| VFID_01 | INFO_11(AVG_RSSI) | ACT_11(PROCESSING) | ADDINFO_MAC(ADDR01) | OK |
| VFID_01 | INFO_21(ASSOCIATION TIME) | ACT_01(GET) | ADDINFO_MAC?(ADDR01) && ADDINFO_SSID?(SSID01) | OK |
| ⋮ | ⋮ | ⋮ | ⋮ | ⋮ |
| VFID_02 | INFO_01(RSSI) | ACT_01(GET) | ADDINFO_DONTCARE | OK |
| VFID_02 | INFO_11(AVG_RSSI) | ACT_11(PROCESSING) | ADDINFO_MAC(ASSOCIATED) | OK |
| VFID_02 | INFO_11(AVG_RSSI) | ACT_11(PROCESSING) | ADDINFO_MAC(NOT_ASSOCIATED) | NG |
| ⋮ | ⋮ | ⋮ | ⋮ | ⋮ |
| * | INFO_11(AVG_RSSI) | ACT_03(READ) | ADDRINFO_DONTCARE | NG |
| ⋮ | ⋮ | ⋮ | ⋮ | ⋮ |

FIG. 8

WIRELESS COMMUNICATION DEVICE, WIRELESS COMMUNICATION METHOD, COMPUTER DEVICE, AND INFORMATION PROCESSING METHOD

CROSS-REFERENCE TO RELATED APPLICATIONS

This application is based upon and claims the benefit of priority from Japanese Patent Application No. 2017-055072 filed on Mar. 21, 2017; the entire contents of which are hereby incorporated by reference.

FIELD

Embodiments described herein relate generally to a wireless communication device, a wireless communication method, a computer device, and an information processing method.

BACKGROUND

Conventional communication devices are specialized for network-related processing. Therefore, they do not include functions for executing general computation (e.g., modification of data and control of data flow). On the other hand, several concepts proposed recently indicate that virtual machines can operate in communication devices to perform general computation within the communication device.

In such cases, the communication device, where virtual machines are installed may execute computation processing. By the environment isolation feature provided by the virtual computing environment, different computation processing can be executed without affecting each another. The virtual computing environment is implemented with software and provides an environment separated from the physical calculation resources. However, problems occur when some applications that need to access information typical to physical environments. For example, consider system software that monitors wireless communication status and performs communication control based on the detected state. For operation of the system software, wireless information such as received power and the number of radio wave interference events detected by the wireless interface is necessary. However, in a virtualized computing environment, the wireless interface is also virtualized. A frame received using wireless communication is converted to a frame in wired communication format before processing. During the conversion process, information included in a header of the received frame and information that is detectable only through the physical wireless interface is lost. Therefore, it is difficult to execute system software for performing the communication control that utilizes the state of wireless communication in the virtual computing environment.

One solution for this problem is the emulation of the wireless interface solely by software. Another method is to allow direct access to the wireless interface, which belongs to the physical resource. Information loss can be prevented by these methods. However, the first method contradicts with the concept of virtualization. Since the specification of wireless interface varies depending on the design, implementation of software would become complicated. One example of the second method that enables direct access to the wireless interface, is SR-IOV specified by PCI-SIG. In this method, it is possible to access information of a wireless LAN from the virtual environment. However, complicated control is needed in the communication device.

BRIEF DESCRIPTION OF THE DRAWINGS

FIG. 8 is a diagram showing an example of a plurality of rules;

DETAILED DESCRIPTION

According to one embodiment, a wireless communication device includes a wireless-communication interface and a wireless-network-information controller. The wireless-communication interface is configured to communicate with one or more terminal using a wireless network. The wireless-network-information controller is configured to receive, a request for wireless network information which is information based on wireless communication with the terminal from a virtual machine operating on a virtual computing environment executed in a processor or a container operating on a container environment executed in the processor, and configured to acquire the wireless network information using the wireless-communication interface based on the request or configured to read out the wireless network information from information given in advance, and transmits the wireless network information to the virtual machine or the container.

Hereinafter, embodiments of the present invention are explained below with reference to the drawings.
(First Embodiment)
(Configuration)

Figure 1:
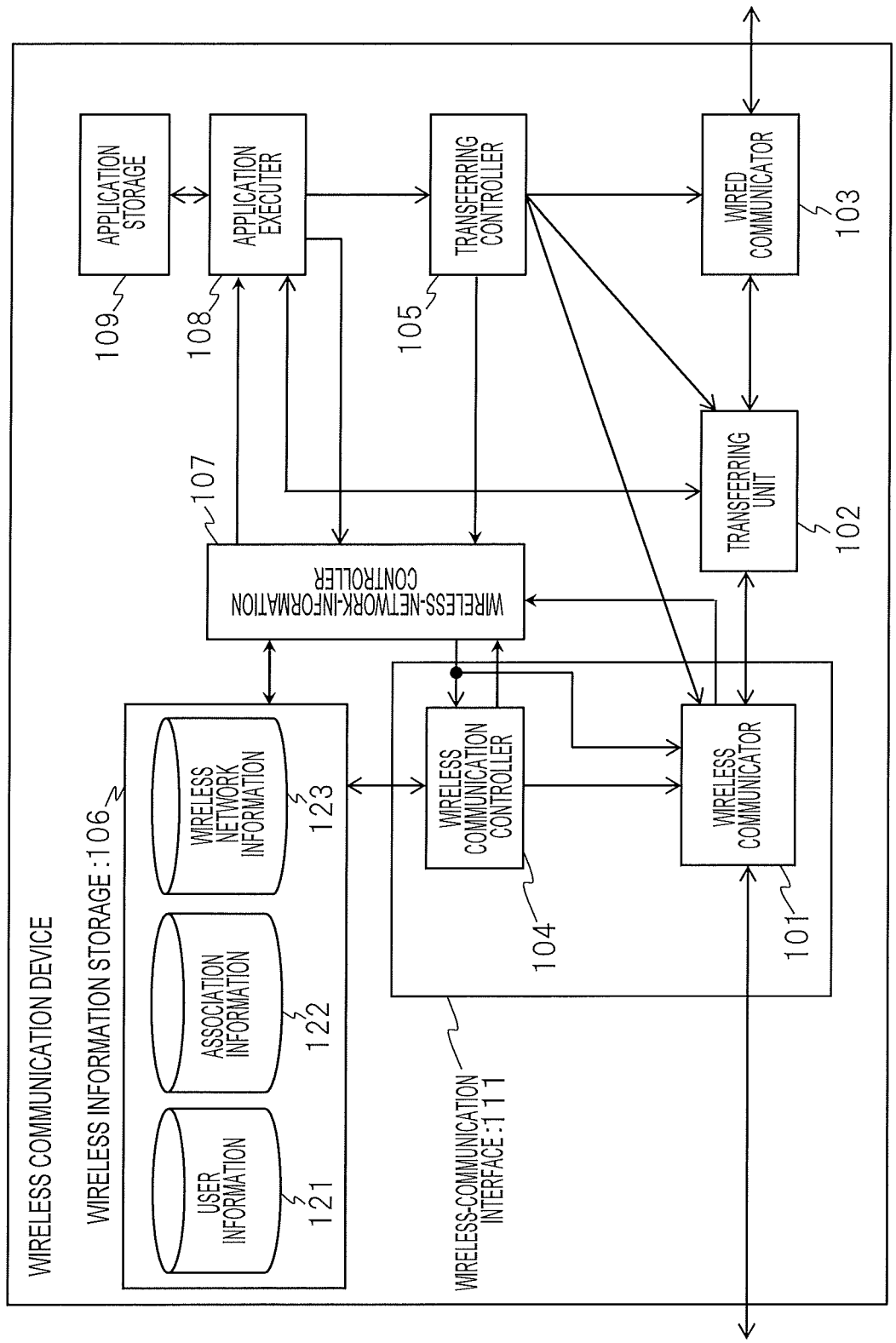
FIG. 1 is diagram showing a configuration example of a wireless communication device according to a first embodiment.

FIG. 1 shows the configuration of a wireless communication device according to an embodiment of the present invention.

The wireless communication device is, for example, a wireless LAN (Local Area Network) access point complying with IEEE802.11ac. The wireless communication device includes a wireless communicator 101, a transferring unit 102, a wired communicator 103, a wireless communication controller 104, a transferring controller 105, a wireless information storage 106, a wireless-network-information controller 107, an application executer 108, and an application storage 109. For example, the wireless communicator 101 and the wireless communication controller 104 configure a wireless communication interface 111 (e.g., a wireless LAN interface). Components irrelevant for the explanation of this embodiment are not illustrated in FIG. 1. Broken lines in the figure indicate flow of data. Solid lines indicate flow of control signals or packets (frames).

The wireless communicator 101 is a wireless communication device operating as an interface that provides connection to a wireless network (a wireless LAN). The wireless communicator 101 includes a wireless circuit (a power amplifier, etc.) corresponding to 5 GHz band, 2.4 GHz band or the wireless frequency in use. The wireless communicator 101 includes a wireless LAN chip implementing MAC layer and PHY layer functionalities, a buffer memory that temporarily stores transmitted and received frames, and a control circuit which controls the wireless LAN chip and the buffer memory. The control circuit manages various wireless communication related data of terminals that are detectable from the wireless LAN chip (hereinafter referred to as wireless network information). The control circuit can store the wireless network information in the buffer memory and provide the wireless network information to the outside of the circuit (e.g., the wireless communication controller 104 and the wireless-network-information controller 107) via a register. Note that, in FIG. 1, these detailed elements (the wireless circuit, the wireless LAN chip, the buffer memory, the control circuit, etc.) included in the wireless communicator 101 are not illustrated.

The wired communicator 103 is a communication interface that provides connection to an external network upstream of the wireless LAN. The wired communicator 103 is, for example, a wired LAN interface corresponding to IEEE802.3ab (1000BASE-T). Note that, although only one interface is shown in the figure, the wireless communication device may include a plurality of interfaces. When the wireless communication device includes the plurality of interfaces, the wireless communication device may include a switching hub LSI to increase the number of connection ports.

The transferring unit 102 transfers data between the wireless communicator 101 and the wired communicator 103. Since the communication methods are different in a wireless network and a wired network, the transferring unit 102 performs conversion of frame format during the data transfer process.

The forwarding controller 105 is a controller that controls transferring operation of the transferring unit 102. For example, the forwarding controller 105 controls frames that prohibit transfer between the wireless communicator 101 and the wired communicator 103, controls the correspondence between VLANs and SSIDs, or the like. Note that the forwarding controller 105 operates based on the control information for controlling transfer. One example when the control information is set to the forwarding controller 105 is when a user interface program (e.g., a Web server or an SSH server) is executed by the application executer 108, or another executer that is not shown, or the like, and the control information is notified to the forwarding controller 105.

The wireless communication controller 104 performs management of the wireless LAN (a wireless network) provided by the wireless communicator 101. For example, the wireless communication controller 104 performs management of connection to wireless communication terminals (hereinafter, terminals), control of a wireless output according to peripheral radio wave conditions, control of receiving sensitivity, or the like. The wireless communication controller 104 receives wireless network information detected by (the control circuit of) the wireless communicator 101 and provides the information received to the wireless-network-information controller 107.

The wireless-network-information controller 107 manages and processes various kinds of wireless network information received from the wireless communication controller 104 and the wireless communicator 101. The wireless-network-information controller 107 can also provide the wireless network information when requested from the other components (the application executer 108, etc.). The processed wireless network information is also an example of the wireless network information.

The wireless information storage 106 saves various data that is needed by the wireless communication device to provide and manage the wireless LAN (the wireless network). The wireless information storage 106 includes, as an example, a storage 121 that stores user information for managing users of the wireless network, a storage 122 that stores association information for managing information of terminals connected to the wireless network, and a storage 123 that stores wireless network information collected from the wireless communicator 101. In this embodiment, it is assumed that the wireless information storage 106 saves the three types of information. However, the wireless information storage 106 may store other information. The user information includes, for example, at least either a user name, a password, an IP address, a MAC address, or the like. The association information includes information such as the time when the terminal is connected to (associated with) the wireless communication device. The wireless network information is information based on wireless communication with the terminal. In this embodiment, the wireless network information is distinguished from the association information and the user information. However, in implementation of the present invention, the wireless network information may be defined to include at least either the association information or the user information.

The application storage 109 stores an application that performs various computation processing on various information or data that are transmitted or received in the wireless network and information, or data related to the application. The application executer 108 executes the application stored in the application storage 109. The application executer 108 includes a virtual computing environment and can execute a plurality of applications (processing) independently using the virtual computing environment. In addition, the application executer 108 can instruct the transferring controller 105 to transfer a packet (or a frame) to a virtual machine (a unit for executing an application) included in the application executer 108. Consequently, the application executer 108 can connect the virtual machine to a specific wireless network or wired network.

Note that the functions of the wireless communication controller 104, the transferring controller 105, the wireless-network-information controller 107, the forwarder 102, and the like may be realized by dedicated hardware or may be realized by software operating in a general-purpose processor. In that case, a single general-purpose processor may be provided or a plurality of general-purpose processors may be provided. Even if the general-purpose processor is physically a single processor, the single processor may be divided into a plurality of processors or the single processor may be logically partitioned. Further, the functions may be realized by a combination of a dedicated circuit or a dedicated processor and the general-purpose processor.

(Details of the Wireless-network-information Controller 107)

The functions of the wireless-network-information controller 107 that plays a central role in this embodiment are explained in detail.

Three major functions are included in the wireless-network-information controller 107.

A first function is a function for receiving wireless network information (hereinafter sometimes simply referred to as information) from the wireless communicator 101 and the wireless communication controller 104 (an information acquiring function).

A second function is a function that processes the received information by applying arithmetic operations and saves the information to the wireless information storage 106 (an information processing and saving function) when needed.

A third function is a function for reading out information from the wireless information storage 106 (i.e., from information given in advance) and providing the information that is read to the application executer 108 (an information read out and response function).

The Functions are Explained Below.

(Wireless-network-information Controller 107: Information Acquiring Function)

The wireless-network-information controller 107 acquires information from internal components of the wireless communication device such as the wireless communicator 101 and the wireless communication controller 104. Content of the information to be acquired may be determined statically or may be determined based on the instructions (information acquisition request) from the application executed by the application executer 108. The wireless-network-information controller 107 may receive an instruction from a processor not shown in FIG. 1 and determine based on the instruction, information to be acquired. In any case, the wireless-network-information controller 107 determines based on some instruction, information that should be acquired.

The instruction for specifying the information to be acquired may include an identifier that specifies the individual information. Alternatively, the identifier of the information to be acquired may be specified by an identifier that specifies the description of some task. In the latter case, the wireless-network-information controller 107 interprets the description of task specified by the identifier and determines the identifier of the information to be acquired. For example, when an identifier that specifies a certain task that "acquires a communication state of a terminal" is designated, identifiers indicating an RSSI, the number of transmitted frames, the number of received frames, a transmission error ratio, and a reception error ratio are specified. It is assumed that a correspondence relation between identifiers of task description and identifiers of information are prepared in the wireless information storage 106 or the like. The identifier that describes the task and the identifier that specifies the information to be acquired are specified. Note that the correspondence relation described here is an example and does not limit the implementation of the present invention.

After determining the information that should be acquired, the wireless-network-information controller 107 acquires information from the wireless communicator 101, the wireless communication controller 104, or the like. There is a plurality of methods for acquiring information. The plurality of methods is distinguished according to presence or absence of requests and a combination of requesting methods and responding methods.

The presence or absence of requests means necessity of issuing requests to a location where information is acquired from during acquisition of information.

When it is necessary to issue a request, several other combinations are possible according to requesting methods and responding methods. For example, it is possible to write an identifier of necessary information to a request register and read out information from a response register. It is possible to transmit a request generated by setting an identifier in a request descriptor and read out a response mapped to a memory (not shown in the figure). It is possible to notify an identifier by using inter-process communication and receive information as a response.

On the other hand, when it is unnecessary to issue a request, for example, it is possible to set the latest information in a register in the referenced side (the location where the information is acquired) and the wireless-network-information controller 107 reads out the value. It is possible to send information sequentially from the location where the information is acquired through a bus in the wireless communication device and the network. In this case, the information is stored in either (a small buffer (not shown in the figure) of) the wireless-network-information controller 107 or the wireless information storage 106.

If a request is notified to a component in the referenced side (the location where the information is acquired) in advance, it is also possible to implement a function that notifies the desired information. For example, if a MAC address is notified to the wireless communication controller 104, it is possible to send the RSSI of the frame to the wireless-network-information controller 107 automatically, with the MAC address described as the source address. Regarding desired information, if the relation to the threshold changes from notified state, it is possible to transmit the information to the wireless-network-information controller 107.

When the wireless communicator 101 or the wireless communication controller 104 is capable of referring to a plurality of information concurrently, the wireless-network-information controller 107 may acquire the plurality of information concurrently.

Examples of information that can be acquired in the methods described above (the wireless network information), there are the following types of information. Other types of information may be acquired based on necessity.

Received radio wave intensity (RSSI), received power, and signal-to-noise ratio (SNR)

A radio wave arrival angle (AoA: Angle of Arrival) and a radio wave arrival time difference (TDoA: Time Difference of Arrival)

Information related to communication amount

The number of transmitted frames and the number of received frames

The number of transmission error frames, the number of reception error frames, a transmission error ratio, and a reception error ratio (The Wireless-network-information Controller 107: Data Processing and Data Saving Functions)

The wireless-network-information controller 107 performs an arithmetic operation to information (the wireless network information) that is acquired, based on necessity to process the information. The wireless-network-information controller 107 will save the information that is processed to the wireless information storage 106. Processing of information include the following.

Removal of errors and correction of errors

When some errors are included in the acquired information, the wireless-network-information controller 107 performs processing to remove or correct the errors.

Statistical operations calculation of average values, medians, modes, maximum values, minimum values, etc.)

The wireless-network-information controller 107 performs statistical operations to the plurality of values that have been acquired. Information regarding the number of samples that arithmetic operations will be applied or the time can be set statistically. They can also be set when a request for providing information is sent to location where the information is acquired.

Normalization of a value

The wireless-network-information controller 107 normalizes the information received and reduces the storage space need to save the information.

There are Different Ways to Save Information.

A list can be prepared for each terminal to save information. The information that is acquired is saved in association with an identifier of the terminal (a MAC address, etc.).

Information can be saved chronologically. When the information that is acquired is saved, they can be aligned according to chronological order.

The information can be tagged and saved. The tags characterize the information that is acquired. The time when the information is acquired, an identifier of the terminal (MAC address), an identifier of the acquired information, or the like can be used as tags.

The data processing and data saving can be executed independently. The combinations of tasks of the data processing and the data saving and order of execution of the tasks do not affect realization of this embodiment, which can be arbitrary. For example, regarding order of execution, the data processing can be executed first and in advance and the information that has been processed can be saved in the wireless information storage 106. Also, the information can be stored, and the stored information can be processed later. The information that is processed can be stored again. It is also possible to save both the information before processing and the information after processing.

The wireless-network-information controller 107 determines the details of data processing, the details of data saving, and the information to be processed in the processing or the saving, based on the request from the application executer 108. Generation rules that define the information to be requested (from the application executer 108), information that is used to generate the information needed (information that is not processed yet), and the combination of the tasks of the processing and the savings can be prepared first. The wireless-network-information controller 107 can operate based on the generation rules. In this case, when the application executer 108 requests information, the wireless-network-information controller 107 refers to the generation rules, determines the details of the data processing and the data saving that should be performed, and determines information necessary to execute the data processing and the data saving. The wireless-network-information controller 107 acquires the determined information as explained above and performs the data processing and the data saving to generate the information requested from the application executer 108. Note that the wireless-network-information controller 107 may receive both the above determined information from the application executer 108 and the request. Then, the wireless-network-information controller 107 can operate based on the generation rules included in the determined information. The generation rules may be represented in a form of a computer program including database operation languages such as a SQL statement or may be combination of identifiers that specify the data processing, the data saving, or the like.

(The Wireless-network-information Controller 107: Information Read Out and Response Functions)

The wireless-network-information controller 107 reads the information from the wireless information storage 106 (i.e., from information given in advance) based on the information reference request (a read request) from other components (the application executer 108, etc.) and returns the information that is read.

The information read out request is notified from the application executer 108 or the like to the wireless-network-information controller 107 according to a method similar to the acquisition request for information explained above. However, the information read out request may be notified to the wireless-network-information controller 107 simultaneously with the information acquisition request or may be notified independently from the information acquisition request. For example, by adding a flag to the information acquisition request, the request may indicate that information is returned to the application executer 108 when the information is acquired.

When the information acquisition request and the information read request are notified simultaneously, the wireless-network-information controller 107 may determine whether the acquisition and the read out should be performed simultaneously depending on the type of information to be acquired. The application executer 108 may add a flag to the information acquisition request or the information read out request to designate explicitly whether the acquisition and the read out are performed simultaneously. Alternatively, a request meaning that the acquisition and the read out are performed simultaneously may be defined. Performing the acquisition and the read out simultaneously means that the acquired (or processed) information is returned to the application executer 108 instantaneously (or after storing the information in the wireless information storage 106). An example when it is determined whether the acquisition and the read out are performed simultaneously depending on the type of information is when the information that the application executer 108 is requested to acquire and to read out is a statistical value. The wireless-network-information controller 107 may respond using the information saved in the wireless information storage 106 (however, the wireless-network-information controller 107 can respond after updating the information with the latest value that was acquired). On the other hand, when the information requested to be acquired or to be read is the present value (the latest value), the wireless-network-information controller 107 returns the acquired information to the application executer 108 immediately (in this case, saving of the acquired information can be carried out in concurrently with the response).

When information read out is necessary because an information read out request is received solely by the application executer 108, the wireless-network-information controller 107 generates instructions for reading out the information which is requested. Then, it notifies the instructions which is generated to the wireless information storage 106. The wireless information storage 106 specifies information that should be read based on the instructions. Then, it reads out the specified information, and sends the information to the wireless-network-information controller 107 as a response. The wireless-network-information controller 107 organizes the information included in the response received from the wireless information storage 106 based on necessities and returns the information to the application executer 108.

(Acquisition of Wireless Network Information in the Application Executer 108)

Figure 2:
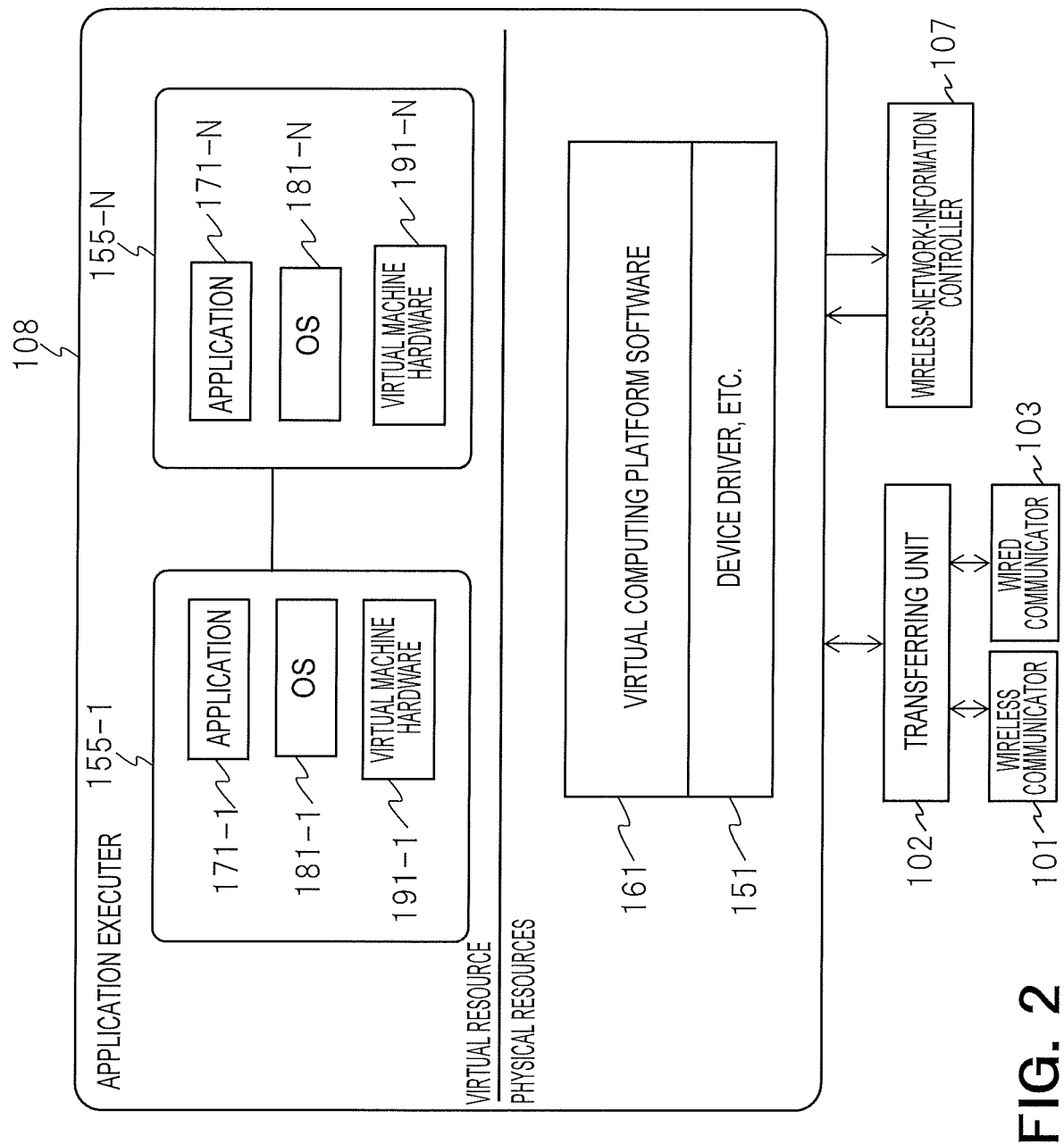
FIG. 2 is a diagram showing a configuration example of an application executer.

Acquisition of wireless network information in the application executer 108 is explained below. One or a plurality of virtual machines are operating in the application executer 108. In FIG. 2, an example configuration of the application executer 108 is shown. Note that, in FIG. 2, besides the application executer 108, the transferring unit 102, the wireless communicator 101, the wired communicator 103, and the wireless-network-information controller 107 are also shown. As an example, the application executer 108 is configured by a physical machine (e.g., a processor such as a CPU) and software operating in the physical machine.

More specifically, a device driver 151 and virtual computing platform software (a virtual machine executing platform) 161 are installed in the physical machine (the processor). The virtual computing platform software is, for example, virtualization software called VMM (Virtual Machine Monitor). Specific examples of the VMM include Xen, KVM, or the like. A plurality of virtual machines (VMs) 155-1 to 155-N are capable of operating on the virtual computing platform software 161. Physical calculation resources of the CPU are shared by the plurality of virtual machines. The virtual machines include virtual machine hardware 191-1 to 191-N. Operating systems (OSs) 181-1 to 181-N and applications 171-1 to 171-N operate on the virtual machine hardware 191-1 to 191-N. The virtual machine hardware is software behaving like a physical machine for the OSs and the applications operating on the OSs. The virtual computing platform software 161 supports the operations of the virtual machines 155-1 to 155-N. The virtual computing platform software 161 performs, for example, CPU scheduling as well. In CPU scheduling, the allocation of CPU physical resources to each of the virtual machines are determined. Then, physical resources of the CPU are allocated to each of the virtual machines. Each virtual machine operates using the allocated physical resources.

(First Mechanism of Information Provision to the Virtual Machine)

Figure 3:
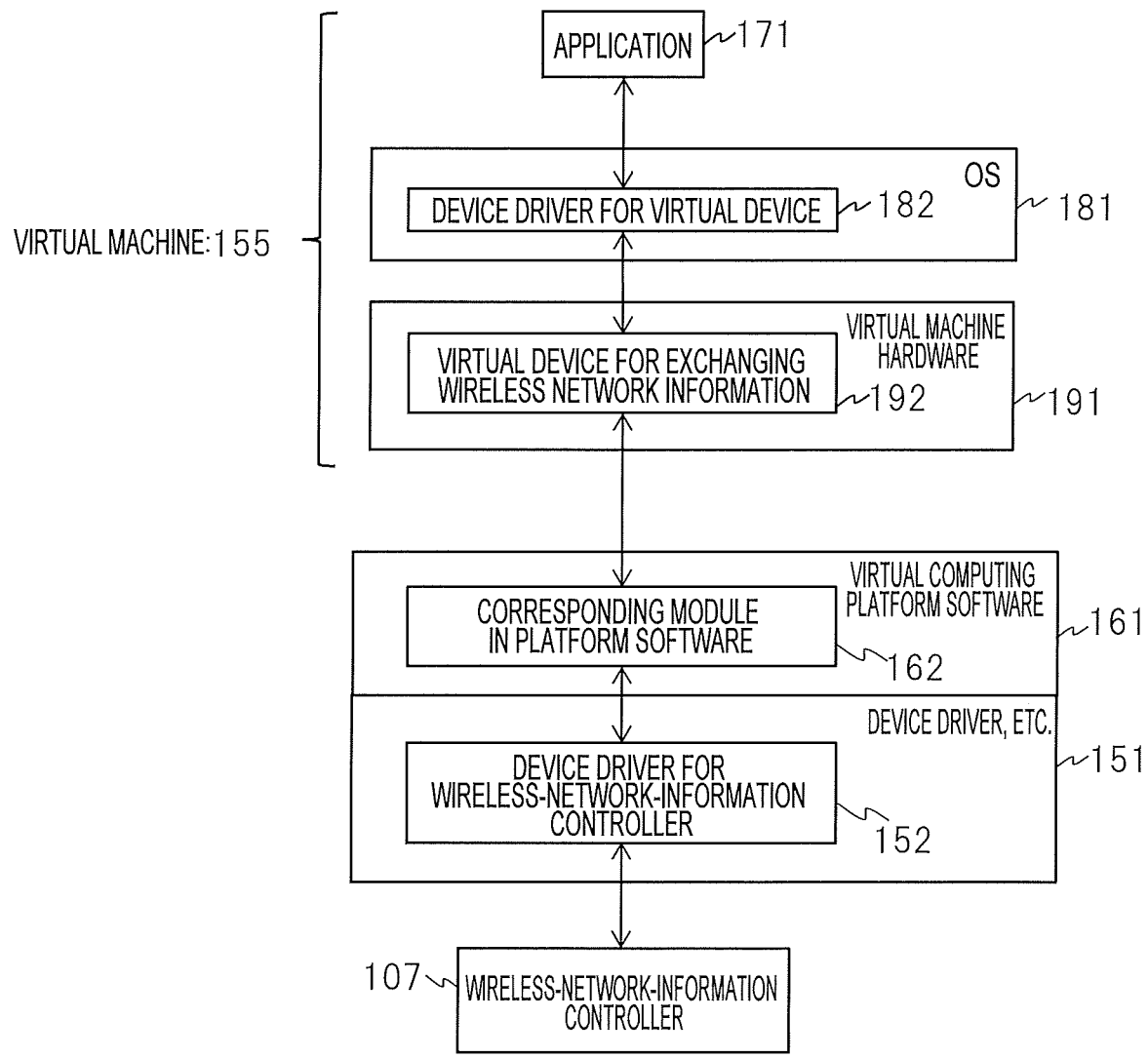
FIG. 3 is a configuration diagram where a virtual device is provided in a virtual machine as an interface.

When the application executer 108 acquires the wireless network information, an interface to the wireless-network-information controller 107 needs to be provided to the application executer 108. Different methods can be used to provide the interface. One method is to provide a virtual device (an interface) to the virtual machine. In FIG. 3, a configuration example for acquiring the wireless network information by assigning the virtual device to the virtual machine is shown.

A virtual device (in the figure, a virtual device for wireless network information exchange) 192 implemented with software is provided in the virtual machine hardware. The virtual computing platform software 161 may generate the virtual device 192 and assign the virtual device 192 to the virtual machine hardware 191. The virtual device 192 can be accessed from the virtual machine. More specifically, the virtual device 192 can be accessed from a device driver for virtual device 182, which is dedicated software, included in OS 181 of the virtual machine. Within the virtual machine, the virtual device 192 can be recognized from the application 171. The application 171 controls the virtual device 192 using the device driver 182. The application 171 can exchange actual information using the virtual device 192.

The virtual computing platform software 161 includes a corresponding module 162. The corresponding module 162 supports the operation of the virtual device 192. The device driver 151 includes a device driver 152 for the wireless-network-information controller 107. The virtual device 192 accesses the wireless-network-information controller 107 from the device driver 152.

It is assumed that the wireless-network-information controller 107 is implemented with hardware. However, the wireless-network-information controller 107 may be implemented with software. In this case, the software can be implemented on a predetermined OS in an environment separate from the virtual computing platform software but running on the same processor as the processor used by the virtual machine 155. In this case, the corresponding module 162 can exchange information with the wireless-network-information controller implemented by software. The wireless-network-information controller implemented by software exchanges information with the wireless communicator 101, the wireless communication controller 104, the wireless information storage 106, or the like from the device driver 151.

(Second Mechanism of the Information Provision to the Virtual Machine)

Figure 4:
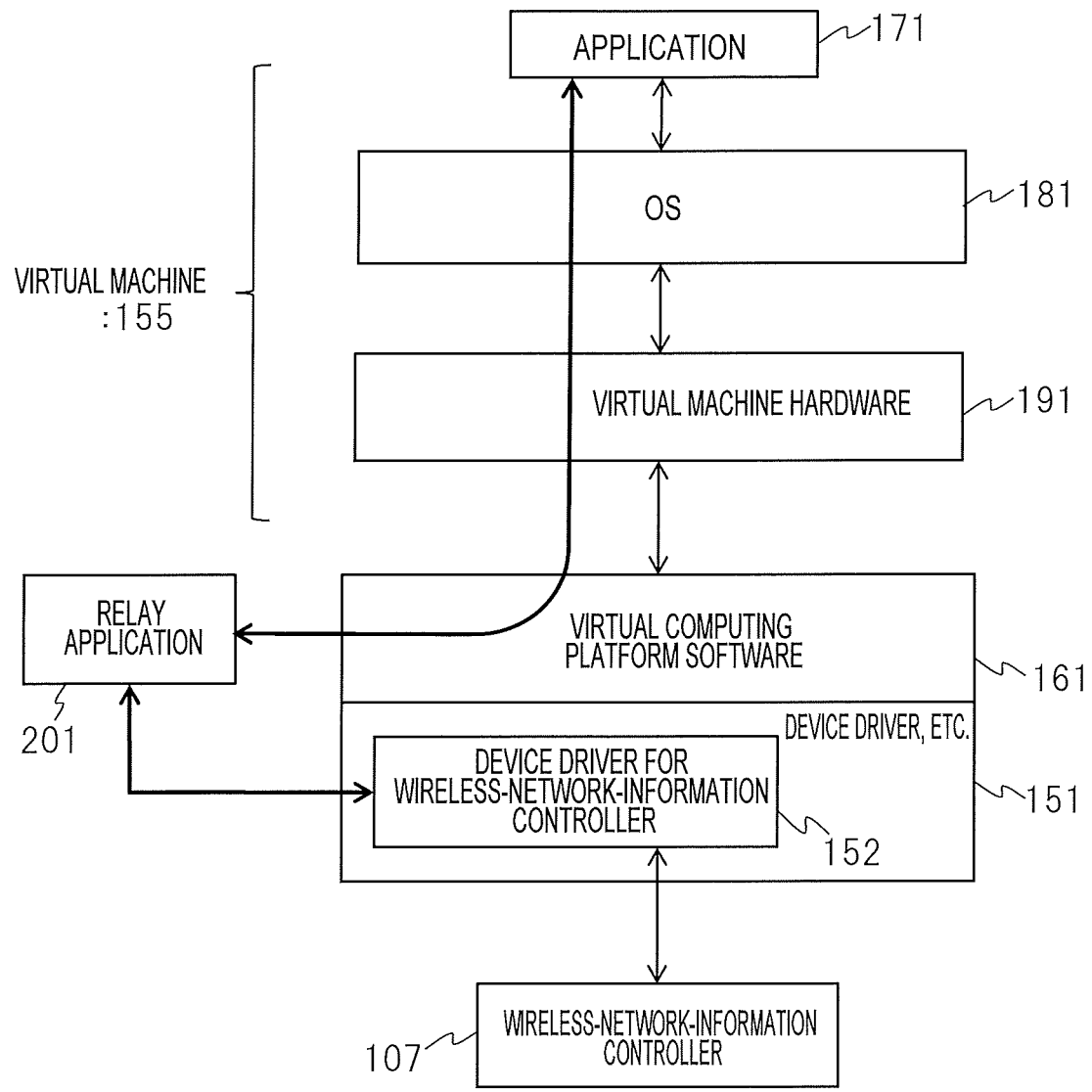
FIG. 4 is a configuration diagram where a relay application is provided in the application executer as the interface.

A second mechanism is a method where a relay application is included in the application executer 108 as the interface to the wireless-network-information controller 107 and an application in the virtual machine communicates with the relay application. In FIG. 4, a configuration example for acquiring information (wireless network information) by providing the relay application (the interface) in the application executer 108 is shown.

A relay application 201 is included in the application executer 108. The relay application 201 is implemented on a predetermined OS in an environment separate from the virtual computing platform software but running on the same processor as the processor of the virtual machine 155. The relay application 201 communicates with the application 171 in the virtual machine 155 through TCP/IP, interprocess communication, or the like and exchanges information. The relay application 201 exchanges information with the wireless-network-information controller 107 using the device driver 152.

(Mechanism of Information Provision to the Virtual Machine: Identifiers for Distinguishing the Virtual Machines)

In the two methods shown in FIGS. 3 and 4, identifiers for identifying the plurality of virtual machines are necessary. Types of the identifiers and treatment of the identifiers are explained below.

When the method shown in FIG. 3 is used, the virtual computing platform software 161 acquires correspondence relation between an identifier of the virtual machine which generates the information acquisition request and the information acquisition request. As identifiers, a process ID or a program name used in the virtual machine or an address of a physical memory used in the virtual machine can be used. Another example is using unique identifiers issued by the virtual computing platform software.

When the method shown in FIG. 4 is used, an IP address allocated to the virtual machine, a virtual MAC address allocated to the virtual machine, a unique virtual machine ID assigned by the virtual computing platform software 161, or the like can be used. Note that the identifier closed within the virtual machine such as the process ID or the program name used in the virtual machine or the physical memory address used within the virtual machine cannot be identified uniquely from outside of the virtual computing environment. Therefore, these identifiers cannot be used as the identifiers of the virtual machines.

(Mechanism of the Information Provision to the Virtual Machine: Mixed)

The methods for exchanging information between the application executer 108 and the wireless-network-information controller 107 (the method of using the virtual device as shown in FIG. 3 and the method of using the relay application as shown in FIG. 4) can be used commonly for the plurality of virtual machines. Different methods can be used for each of the virtual machines.

(Sequence)

A sequence of operation according to this embodiment is explained with reference to FIGS. 5 to 7. This sequence can be executed by both of the two methods explained with reference to FIGS. 3 and 4.

(Only a Reading Function)

Figure 5:
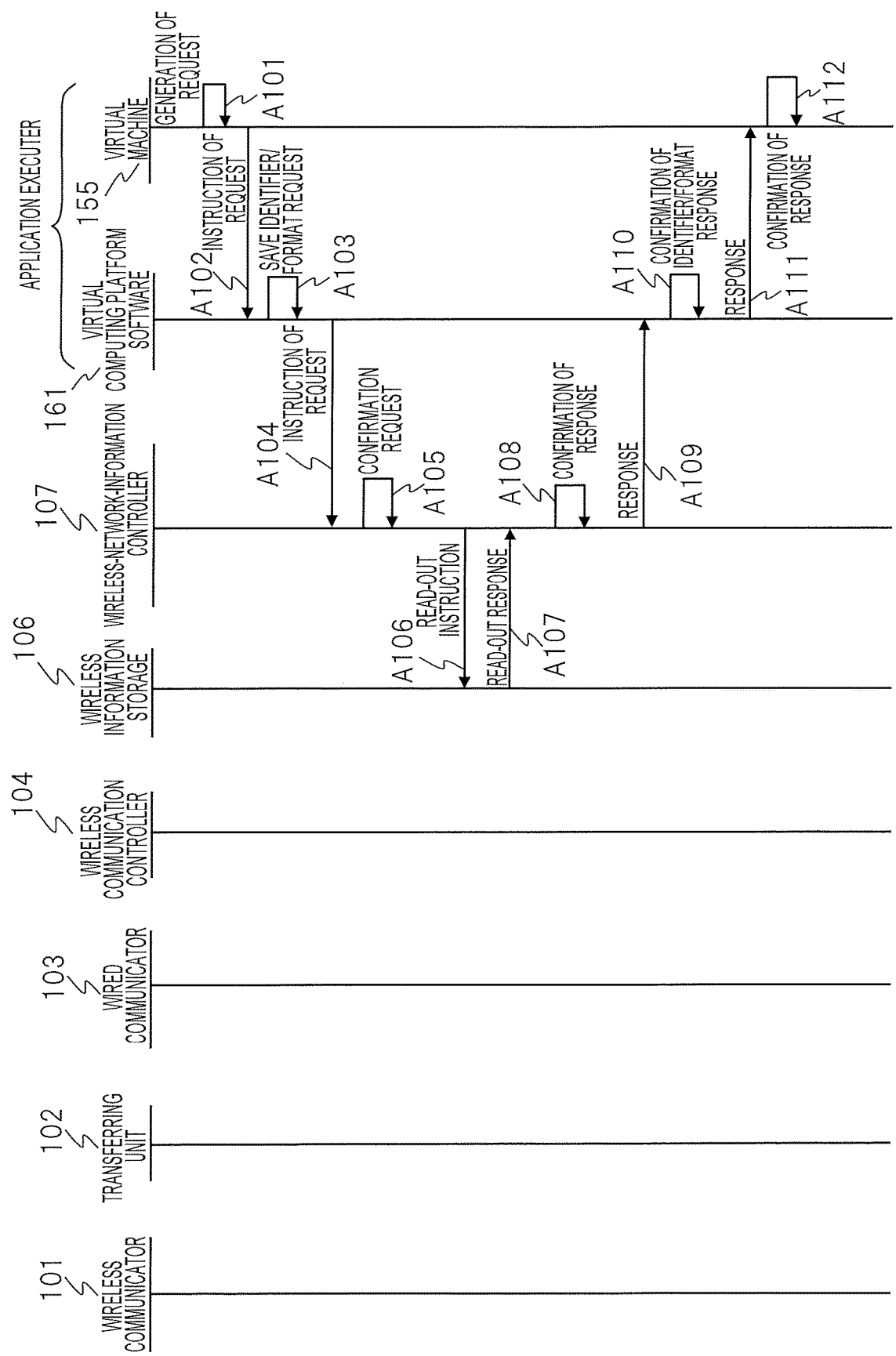
FIG. 5 is a sequence chart of operation according to the first embodiment.

FIG. 5 is a sequence for reading out information (wireless network information) saved in the wireless information storage 106 required by the application executer 108.

The virtual machine 155 generates an information acquisition request (A101) and passes the generated acquisition request to the virtual computing platform 161 (A102). The acquisition request serves as a read-out request as well (e.g., a flag is added to the acquisition request). The virtual computing platform 161 specifies the virtual machine which is the source of the acquisition request and saves the identifier of the specified virtual machine in a memory or the like in association with the acquisition request (A103). The virtual computing platform 161 forms the acquisition request into a format interpretable by the wireless-network-information controller 107 (A103) and passes the acquisition request to the wireless-network-information controller 107 (A104).

The wireless-network-information controller 107 confirms whether the information requested by the acquisition request is saved in the wireless information storage 106 (A105). If the information is saved, the wireless-network-information controller 107 issues a read-out instruction for the requested information to the wireless information storage 106 (A106). The wireless information storage 106 reads out the information requested and returns a response (a read-out response) including the information to the wireless-network-information controller 107 (A107).

The wireless-network-information controller 107 confirms the received read-out response (A108), extracts the information included in the read-out response, generates a response including the information, and returns the response to the virtual computing platform 161 (A109). The virtual computing platform 161 specifies the virtual machine identifier corresponding to the received response and generates a response for the virtual machine having the virtual machine identifier (A110) based on the information included in the response. The virtual computing platform 161 returns the generated response to the virtual machine 155 (A111). The virtual machine 155 receives the response and acquires the information from the response (A112). Consequently, the virtual machine 155 acquires the information requested by the acquisition request.

(Acquisition, Processing, and Readout)

Figure 6:
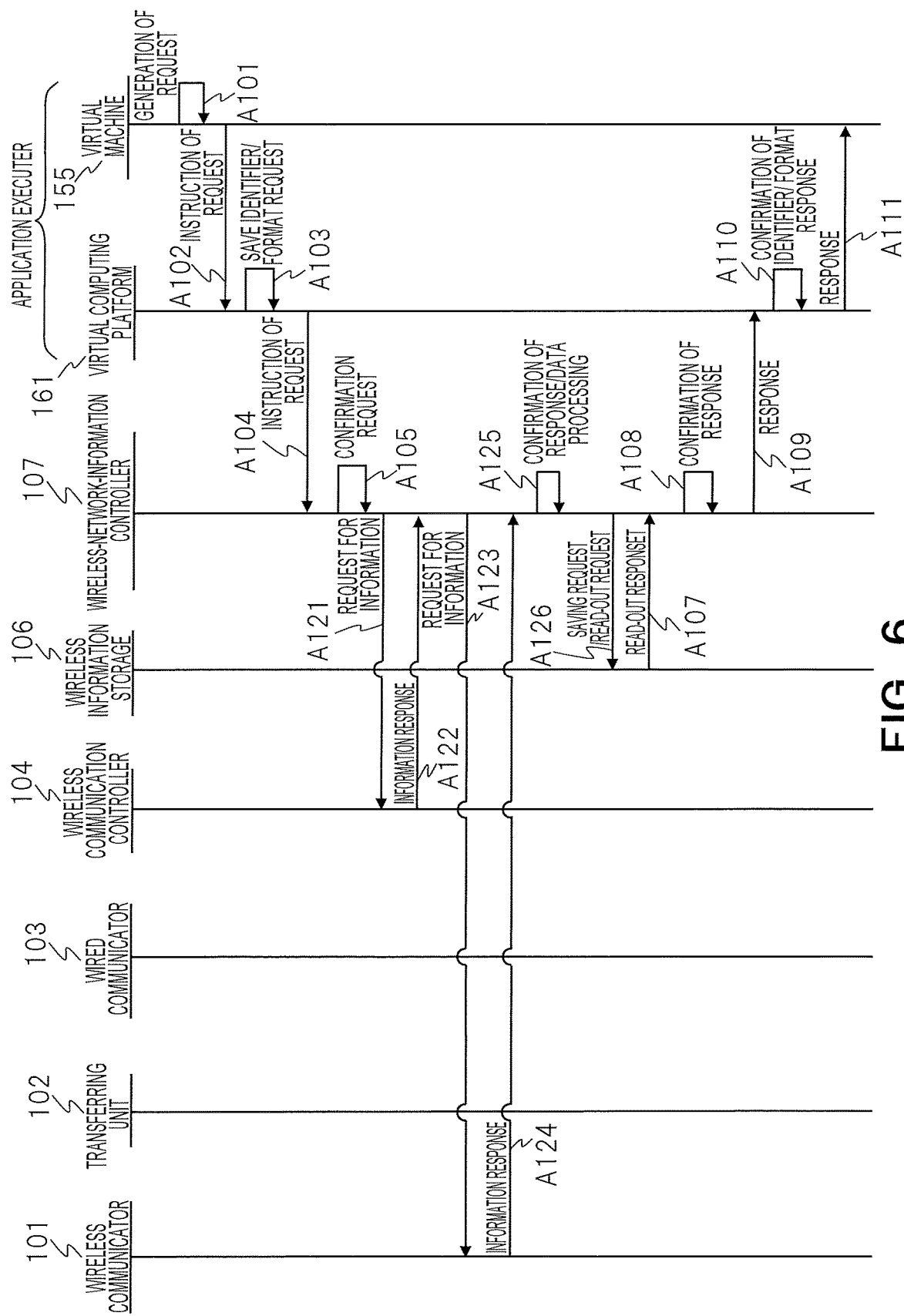
FIG. 6 is a sequence chart of operation according to the first embodiment.

FIG. 6 shows a sequence for reading out information required by the application executer 108, when the information is not saved in the wireless information storage 106. Steps that are the same as or, corresponding to the steps in FIG. 5 are denoted with the same signs. When the information requested by the acquisition request is not saved in the wireless information storage 106, the wireless-network-information controller 107 sends an acquisition request for the information (an information request) to the wireless communication controller 104 or the wireless communicator 101 (A121 or A123) and obtains a response including the information (an information response) (A122 or A124). Whether the information request is sent to the wireless communication controller 104 or the wireless communicator 101 depends on the information that is requested. The wireless-network-information controller 107 processes the information included in the received information response according to the acquisition request received from the application executer 108 and returns a response including the information that is processed (A109). In this case, the wireless-network-information controller 107 may save the information that is processed in the wireless information storage 106 to enable the reuse of the processed information (A126). The wireless-network-information controller 107 may save the processed information first to the wireless information storage 106, then read out the saved information, and return the response (A126, A107, A108, and A109). The subsequent steps are the same as the steps in FIG. 5 (A110, A111, etc.).

(Prior Reservation)

Figure 7:
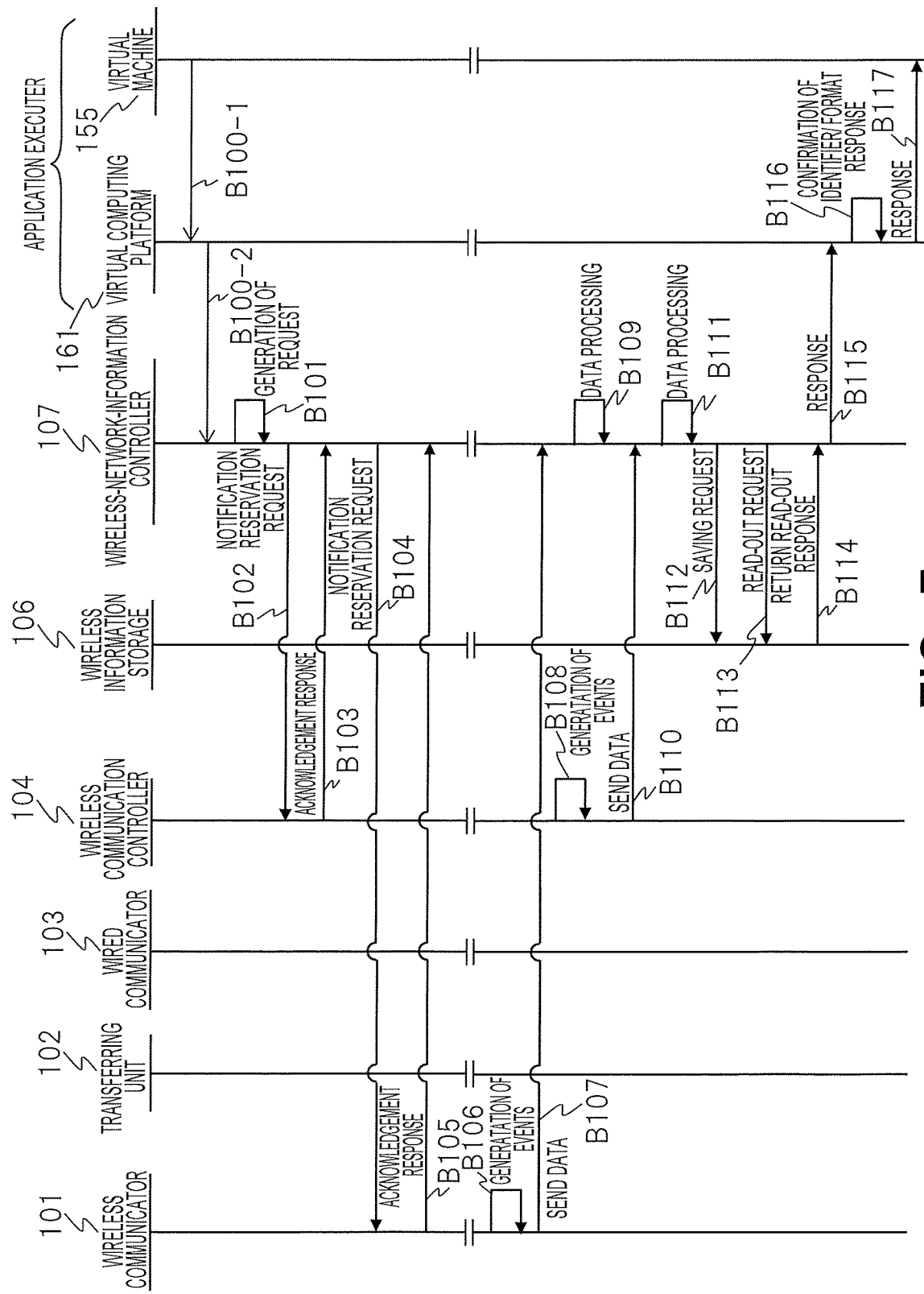
FIG. 7 is a sequence chart of operation according to the first embodiment.

FIG. 7 is an example of the sequence for transmitting information to the virtual machine automatically when the information is generated.

The application executer 108 sends a reservation request that instructs the wireless-network-information controller 107 to send the information to the application executer 108, when information is generated or acquired (B100-1 and B100-2). More specifically, the virtual machine 155 generates the reservation request and passes the reservation request to the virtual computing platform 161 (B100-1). The virtual computing platform 161 specifies a virtual machine which is the source of the reservation request and saves the identifier of the specified virtual machine in a memory or the like in association with the reservation request. The virtual computing platform 161 forms the reservation request into a format that is interpretable by the wireless-network-information controller 107 and passes the reservation request to the wireless-network-information controller 107 (B100-2).

The wireless-network-information controller 107 generates a notification reservation request including an identifier of information that needs to be notified, the notification condition of the information or the like based on the received reservation request (B101). The wireless-network-information controller 107 can determine the identifier of the information, the notification condition, or the like according to content of the information designated by the reservation request. Note that the application executer 108 may designate the identifier or the notification condition. In this case, the identifier or the notification condition is included in the reservation request. The wireless-network-information controller 107 sends the generated notification reservation request to the wireless communication controller 104 or the wireless communicator 101 (B102 or B104). Whether the notification reservation request is sent to the wireless communication controller 104 or the wireless communicator 101 depends on the information. When the notification reservation request is accepted, the wireless-network-information controller 107 receives an acknowledgment response from the wireless communication controller 104 or the wireless communicator 101 (B103 or B105).

When an event satisfying the notification condition is generated (e.g., a specific frame is received) in the wireless communicator 101 or the wireless communication controller 104 (B106 or B108), the wireless communicator 101 or the wireless communication controller 104 generates information specifying the notified identifier and sends the information to the wireless-network-information controller 107 (B107 or B110). The wireless-network-information controller 107 processes the received information according to the request from the application executer 108 (B109 and B111). Then it saves the processed information to the wireless information storage 106 (B112), and sends a response including the processed information to the virtual computing platform 161 of the application executer 108 (B113, B114, and B115). The virtual computing platform 161 specifies a virtual machine identifier corresponding to the response that is received and generates response for a virtual machine having the virtual machine identifier based on the information included in the response (B116). The virtual computing platform 161 returns the response that is generated to the virtual machine 155 (B117). The virtual machine 155 receives the response and extracts the information from the response. Thus, the virtual machine 155 obtains the information requested by the prior reservation.

(Examples of Information used by the Applications on the Virtual Machine)

When applications on the virtual machine operating in the application executer 108 uses the information (the wireless network information) obtained by using the method explained above, the application uses the information for uses described in the following examples.

EXAMPLE 1

Acquire a list of terminals associated at X o'clock to Y o'clock in weekdays or holidays.

EXAMPLE 2

Acquire the number of terminals with average received signal power of α (dBm) or more, among the terminals associated at X o'clock to Y o'clock in weekdays or holidays.

EXAMPLE 3

Confirm whether a terminal, with a MAC address of certain value, is connected.

EXAMPLE 4

Obtain a list of timestamps when a terminal with a MAC address of certain value, has connected in the past.

EXAMPLE 5

Obtain a list of timestamps when a terminal having certain user information has connected in the past and average received signal power in each of the occasions.

The usage described above are only examples. Actually, the information can be used in various forms according to purposes of the applications.

(First Embodiment: Summary)

As explained above, according to this embodiment, the wireless-network-information controller that acquires network information from the wireless communicator, the wireless controller, or the like is provided in the wireless communication device. The interface to the wireless-network-information controller is provided to the application executer where the virtual machine operates. Consequently, the wireless network information can be used from the application operating within the virtual machine. It is possible to perform customized control according to the state of the wireless network. For example, it is possible to change the channel used by the wireless network if the average received signal power for predetermined certain number or more of terminals is smaller than the threshold value. It is possible to change the modulation method or the communication method to methods that enable transmission or receiving of more information if there are a large number of terminals with average received signal powers of α or more. The example explained above is only an example. Other various controlling methods are possible.

(Second Embodiment: Addition of a Filtering Function)

A block diagram according to this embodiment is the same as the block diagram (FIG. 1) in the first embodiment. However, this embodiment is different from the first embodiment in the fact that the wireless-network-information controller 107 includes a filtering function.

By using the filtering function, it is possible to provide a response to the request based on the preconfigured rules (filters), when a request is received from the virtual machine of the application executer 108. For example, only when the information requested by the request matches a predetermined condition, the information is acquired and a response is sent. Only when a terminal related to the request satisfies a condition, requested information can be acquired. In the first embodiment, the wireless-network-information controller 107 returns the information requested from the virtual machine directly. In this embodiment, using the wireless-network-information controller 107 with the filtering function, it is possible to provide information corresponding to the functions of individual virtual machines and the services provided by the individual virtual machines.

The filtering function can be applied in each stage when the wireless-network-information controller 107 is operating. Specifically, the filtering function can be applied when an acquisition request is received from a virtual machine (an acquisition stage of information), when a saving request is transmitted to the wireless information storage (a saving stage of the information), when a readout request is transmitted to the wireless information storage (a readout stage of the information), and when the information read out from the wireless information storage is transmitted to the virtual machine (a response stage of the information). The application of the rules in each of the stages may be performed independently from the other stages. It is also possible to define one or a plurality of rule sets, which are combinations of rules applied in each of the stages. If the rule set applied to a stage is selected, the selected rule set will be applied in the corresponding stage of operation.

(Application of the Rules)

As a first method, it is possible not to apply the rules in the information acquisition stage and the information saving stage to the wireless information storage 106. Instead, the rules are applied when the information is returned to the application executer 108. In this method is used, even if a virtual machine that was not operating before a certain time requests acquisition of information generated before the start of operation, the wireless-network-information controller 107 can provide the appropriately filtered information (extracting only information belonging to a period before the operation). This method can handle a large amount of information but increases the amount of information that should be saved.

As a second method, it is also possible to apply the rules in the information acquisition stage and the information saving stage to the wireless information storage 106 and not applying the rules in the responding stage to the application executer 108. In this case, it is possible to acquire minimum information that is required by using rules that were configured before or rules set by an operating virtual machine. Then, the acquired information can be saved in the wireless information storage 106. By using this method, it is possible to reduce the amount of information that needs to be saved. However, if a new virtual machine starts to operate or the request from the application executer 108 changes, the information that can be provided to the virtual machines may become insufficient.

Note that, in the explanation explained above, the processing for applying rules is executed by one component (the wireless-network-information controller 107). However, the application of the rules may be executed by a plurality of components (a plurality of software). For example, it is possible to apply the rules using software implementing MAC layer functionality and also apply the rules in (an application implementing the functions of) the wireless-network-information controller 107 during the information acquisition stage and the information read-out stage. For example, regarding the application of the rules by the software implemented with MAC layer functionality, it is possible to apply the rules to information that is not processed yet.

(Example and Explanation of the Rules)

An example of a plurality of rules is shown in FIG. 8. One lateral row corresponds to one rule. As shown in this example, the rule includes an identifier (a request source ID) for identifying a virtual machine or a computer program serving as a requester of information acquisition, an identifier (an information ID) for identifying the target information, identifiers for the action to be performed (acquisition (GET), setting (SET), saving (SAVE), read-out (READ), statistical value calculation (CAL), etc.), identifiers for additional conditions (conditions for limiting targets during execution of actions or conditions required for executing actions), and an identifier for identifying execution permission.

In FIG. 8, the identifiers of the items are predetermined values. Although the identifiers of the items are represented by character strings, the actual identifiers are represented by words in 32 bits or 64 bits units. The sign "*" in the request source ID indicates that a location of request is not specified (the location of source may be any location).

Descriptions surrounded by parentheses for each of the identifiers describe the meanings of each identifier. The descriptions within parentheses may be absent. For example, INFO_01 in the information ID (information identifier) represents RSSI, INFO_11 represents AVG_RSSI, that is, the average RSSI in a certain period. Besides, the information itself and information obtained by applying some arithmetic processing can be designated as the information ID. Note that AoA means a radio wave arrival angle (Angle of Arrival) as explained above.

The identifier ACT_01 for the action represents information acquisition (i.e., GET), ACT_11 represents processing (i.e., Processing), and ACT_03 represents read-out (i.e., READ) from the wireless information storage 106.

ADDINFO_MAC( ) in the additional conditions represents a MAC address having a value surrounded by parentheses and ADDINFO_MAC (ASSOCIATED) represents (a set of) MAC addresses of terminals associated with the wireless communication device. ADDINFO_MAC (NOT_ASSOCIATED) represents (a set of) MAC addresses of terminals not associated with the wireless communication device. Actually, since there are a large number of MAC addresses of terminals not associated with the wireless communication device, processing for confirming that a MAC address is not an associated MAC address needs to be performed. The additional condition described in this paragraph corresponds to a condition concerning communication environment in a terminal where the action is executed.

ADDINFO_DONTCARE indicates that the additional condition is not involved. ADDINFO_SSID( ) indicates that the requester belongs to a wireless network with an SSID of a value surrounded by parentheses. "?" (see line 5 of FIG. 8) indicates that the additional condition added with "?" is used as a condition requirement (a condition required for executing operation corresponding to the action identifier). A logical operation with a plurality of conditions (e.g., in FIG. 8, AND of the plurality of conditions is described by "&&") is possible. "OK" and "NG" of the execution permission indicate that execution is possible and impossible (i.e., application of the rules is possible and impossible) respectively. For example, for the case where there is an "OK", the execution of the action is permitted when the action meets the rules. In the case where there is a "NG", the execution of the action is not permitted when the action meets the rules. Note that, when a received request does not meet any of the rules, the request is not executed. In that case, an error response may be sent to the requester.

Note that the management of the rules and the representation of the rules explained above are only examples. Other methods can be employed. In the example shown in FIG. 8, all of the rules are managed in a single table. However, tables for the rules may be prepared for each of the stages when referring to the rules.

(Explanation of the Addition Condition)

More explanation on additional condition is given here. As explained above, the additional condition includes conditions for the terminal where the information is acquired or the condition required for execution of action.

As an example of the former condition, there is the condition (e.g., a MAC address) for specifying the target terminal itself or the condition (e.g., an associated terminal) for specifying the state of the terminal (or characteristics of the terminal). In the case of the former condition, the action is executed for only the information which satisfies the condition. If the action cannot be executed because the information satisfying the condition is absent or is not acquired, or the like, the wireless-network-information controller 107 returns an error response to the application executer 108. In the case of the latter condition, the state of the terminal is determined from information representing the state of the terminal during the execution of action. For example, when a state "associated terminal" is assigned, associated terminals can be detected by acquiring a list of MAC addresses of associated terminals. If it is found that the information related to the associated terminals is present by confirmation, the action is executed based on the information. If the logical "AND" of both the former condition and the latter condition is assigned as the additional condition, it is possible to execute the action on the information related to a terminal having the predetermined MAC address within the associated terminals.

On the other hand, for the case of the latter requirement needed to execute the action, it is confirmed that the condition is satisfied. For example, for line 5 of FIG. 8, if both the MAC address of the terminal managed by the wireless communication controller 104 and the information ID of an acquisition target are assigned by a request from the application executer the wireless-network-information controller 107 refers to the wireless communication controller 104 or the wireless information storage 106 and checks whether the SSID of the access point where the terminal having the corresponding MAC address belongs to is "SSID01". If the SSID is "SSID01", the wireless-network-information controller 107 executes the action on the terminal related to the information and acquires association time of the terminal.

(Application Order of the Rules)

An order may be configured to the plurality of rules, so that the rules are applied in a specified order. Operation performed when a matching rule is not found after checking all the rules depends on design and implementation. For example, a request may be rejected. The operation may be defined according to a type of the action designated in the request (e.g., Only acquisition of the present value is permitted. Setting values, read out of past values, and derivation (calculation) of new values using past values are not allowed).

(Flowcharts for Rule Processing)

Figure 9:
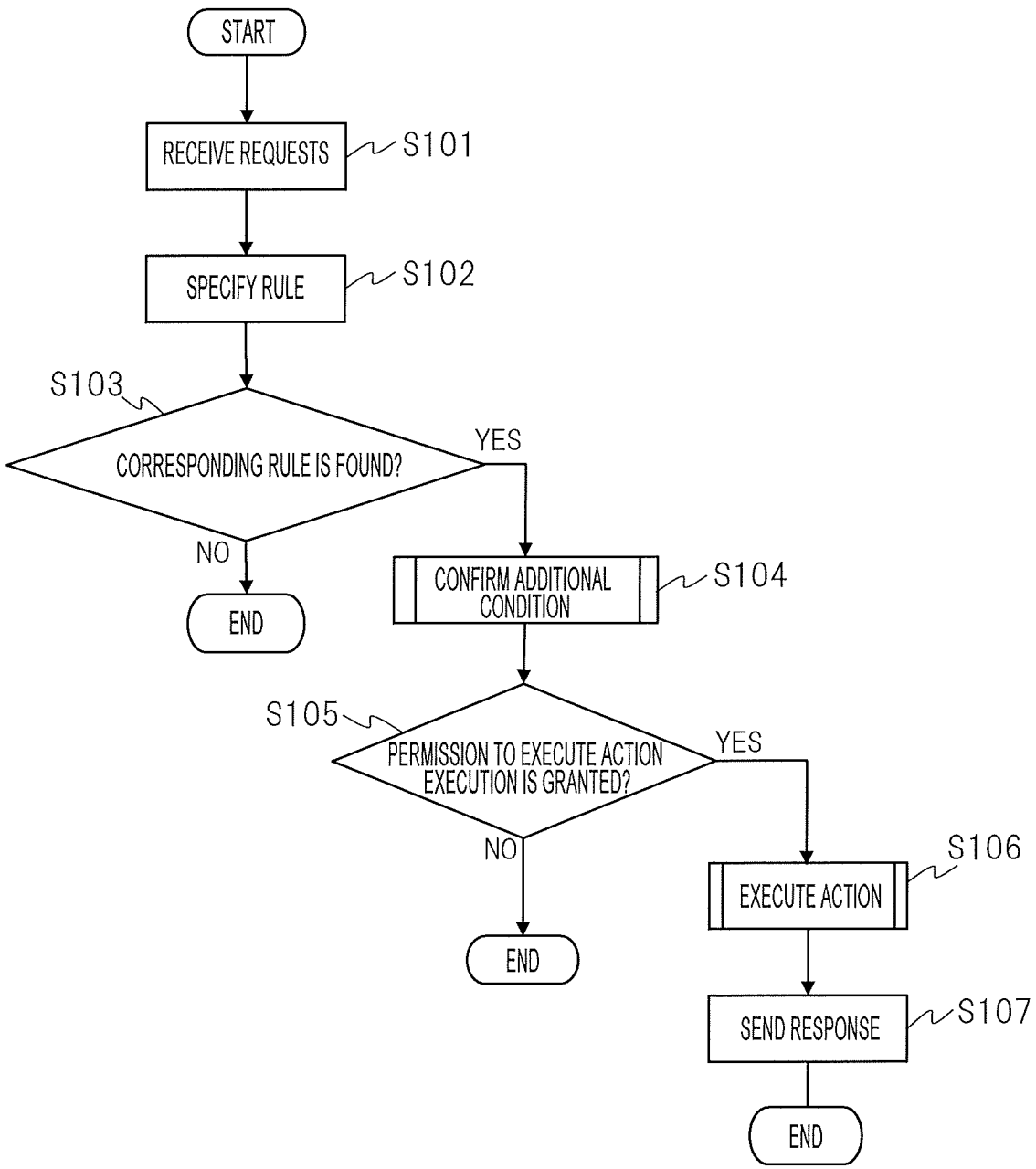
FIG. 9 is a flowchart showing the operation of a wireless-network-information controller.
Figure 10:
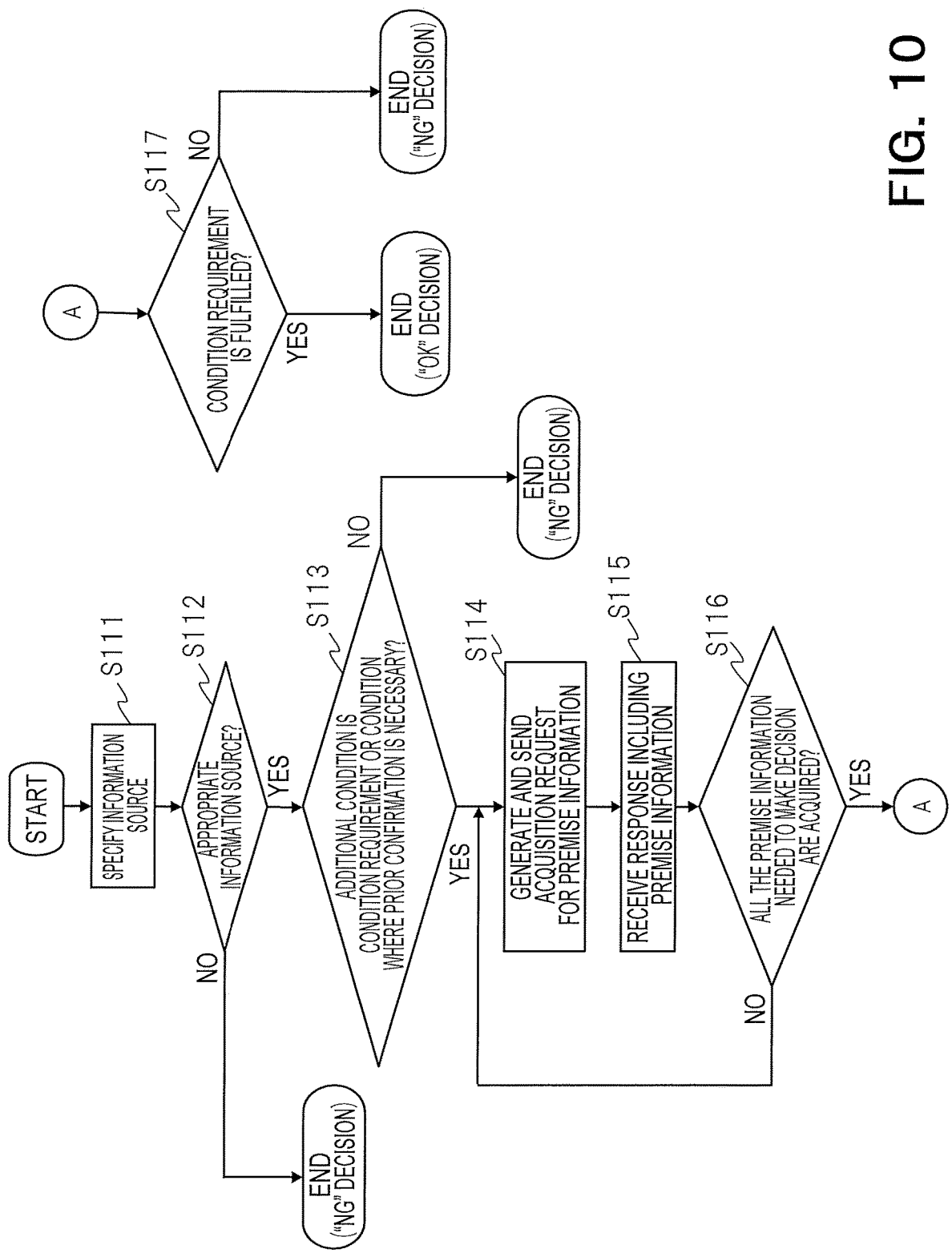
FIG. 10 is a flowchart showing confirmation processing of an additional condition.
Figure 11:
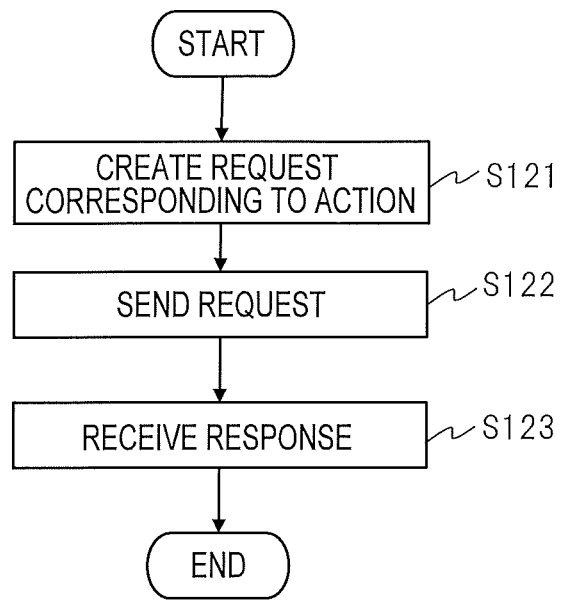
FIG. 11 is a flowchart showing execution of action.

FIGS. 9 to 11 are flowcharts showing the operation of the wireless-network-information controller 107 according to this embodiment. FIG. 10 is a detailed flowchart of step S104 (confirmation processing of additional conditions) in FIG. 9. FIG. 11 is a detailed flowchart of step S106 (execution of actions) in FIG. 9.

In FIG. 9, the wireless-network-information controller 107 receives a request (an acquisition request, a reservation request, or the) from a virtual machine (S101) and specifies the rule applied to the virtual machine (S102). The request includes a request source ID, an information ID, an action ID, and a condition of the information to be acquired (e.g., the MAC address of a terminal). A corresponding rule is specified based on the requester ID (a virtual machine ID), the information ID, the action ID, and the condition of the information to be acquired (e.g., the MAC address of the terminal) included in the request using the table shown in FIG. 8 or the like. If the rule corresponding to the requester ID is absent (NO in S103), the wireless-network-information controller 107 terminates the processing (i.e., does not execute the request from the virtual machine).

If the rule corresponding to the requester ID is found (YES in S103), the wireless-network-information controller 107 performs a confirmation process for the additional condition in the specified rule (S104). More specifically, the wireless-network-information controller 107 confirms whether information subjected to the additional condition first is information from an appropriate information source, as shown in FIG. 10(S111). The appropriate information source is a component of the wireless communication device or an external apparatus (e.g., an associated terminal), when information can be acquired from the external apparatus using the components of the wireless communication device by some means. The appropriate information is obtained beforehand. If the information subjected to the additional condition is not the information from an appropriate information source (NO in S112), the wireless-network-information controller 107 makes the "NG" decision (decides not to execute the action).

If the information subjected to the additional condition is information from the appropriate information source (YES in S112), the wireless-network-information controller 107 confirms whether the additional condition is the condition requirement (S113). If the additional condition is not the condition requirement (NO in S113), the wireless-network-information controller 107 makes the "OK" decision (decides to execute the action). On the other hand, if the additional condition is the condition requirement (YES in S113), the wireless-network-information controller 107 sends the acquisition request for information needed to determine fulfillment of the condition requirement (referred to as premise information) to either the wireless communication controller 104, the wireless information storage 106, or the wireless communicator 101 and acquires a response including the premise information (S114 and S115). Note that, when the condition requirement includes a plurality of conditions and when all the premise information that is needed is not collected (e.g., when the condition requirement "associated terminal" is set, MAC addresses of all the associated terminals cannot be acquired simultaneously) in a single request and response (S114 and S115), the wireless-network-information controller 107 issues the acquisition request repeatedly until all the premise information that is needed can be acquired (NO in S116). Thereafter, the wireless-network-information controller 107 determines fulfillment of the condition requirement based on the premise information (S117). If the condition requirement is not fulfilled (NO in S117), the wireless-network-information controller 107 makes the "NG" decision (decides not to execute the action). If the condition requirement is satisfied (YES in S117), the wireless-network-information controller 107 makes the "OK" decision (decides to execute the action).

Returning back to FIG. 9, if the "OK" decision is made (the execution of the action is determined) (YES in S105), the wireless-network-information controller 107 executes the action indicated by the relevant rule (S106). More specifically, as shown in FIG. 11, the wireless-network-information controller 107 generates a request corresponding to the action (S121). For example, if the action indicates acquisition of certain information, the wireless-network-information controller 107 generates an acquisition request for the information. The wireless-network-information controller 107 sends the generated request to the relevant components (the wireless communication controller 104, the wireless information storage 106, or the wireless communicator 101) (S122) and receives a response from the component in the destination of request (S123). The response does not always include the requested information. The response could be an error response.

The wireless-network-information controller 107 sends a response to the virtual machine which is the requester based on the information obtained by the execution of action (S107). Note that, if the request includes a request for processing information, the wireless-network-information controller 107 processes the acquired information and transmits the response including the information that is processed.

Although not shown in FIG. 10, if the additional condition serving as the condition requirement is a condition assigning a state (or a characteristic) of a terminal (e.g., "associated terminal"), the wireless-network-information controller 107 saves information necessary for the upcoming execution of action (step S106 in FIG. 9). For example, in steps S114 to S116 in FIG. 10, the wireless-network-information controller 107 acquires a terminal list by confirming the associated terminals during the condition requirement check. When executing the action in step S106 of FIG. 9, the wireless-network-information controller 107 assigns a terminal from the terminal list. Note that the location to save the information necessary for the execution of action may be within the wireless-network-information controller 107. Alternatively, storage space may be allocated within the wireless information storage 106.

(Additional Information of the Rules: when the Wireless Communication Device Provides a Plurality of Wireless Networks)

When the wireless communication device provides (forms) a plurality of wireless networks, an identifier (an SSID (Service Set Identifier), etc.) of a wireless network and an identifier of a terminal can also be combined as the condition requirement. Thus, it is possible to perform filtering of information taking into account the possibility that the same terminal is connected to plurality of wireless networks.

On the other hand, when different virtual machines acquire information regarding the same wireless network, it is also possible to apply limitations. For example, access may be limited to only the information of terminals that are related to (e.g., communicating with) the respective virtual machines. In that case, as an additional condition (condition requirement), "ADDINFO_MAC? (IN_FDB)" can be added, for example. The additional condition means that "an entry is present in the forwarding database (FDB) managed by the transferring controller 105 within the wireless communication device". By limiting the searching range within the FDB to virtual machines specified by request source IDs, it is possible to prevent access to information of terminals related to the other virtual machines.

Figure 12:
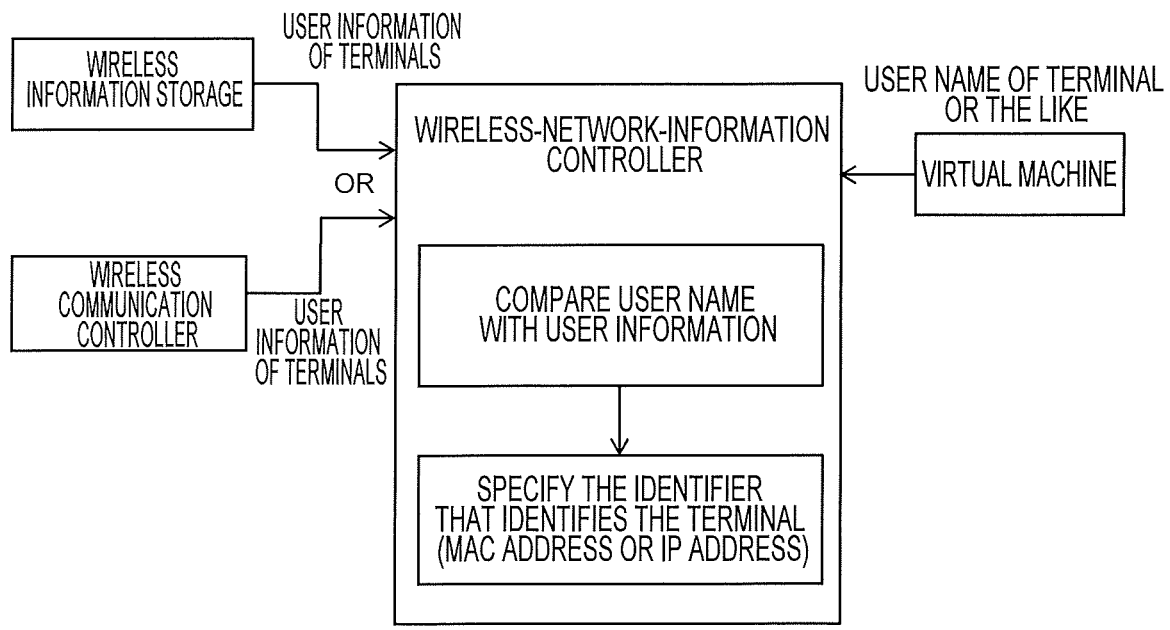
FIG. 12 is an explanatory diagram of a second embodiment.

It is also possible to make a certain virtual machine to refer to only information of terminals related to the virtual machine. For example, as shown in FIG. 12, a virtual machine provides the user name of the service user, information equivalent to the user name, or the like to the wireless-network-information controller 107. The wireless-network-information controller 107 acquires, from the wireless communication controller 104 or the wireless information storage 106, user information of terminals connected to the wireless network. Note that the wireless-network-information controller 107 may acquire the user information from both the wireless communication controller 104 and the wireless information storage 106. The user information includes, the user name of the user of the terminal, the IP address, the MAC address used by the terminal or the like, for example. The wireless-network-information controller 107 may compare the user name with the user information of the terminals and specify the user information matching the user name. From the specified user information, identifiers of the terminal such as the IP address or the MAC address used by the terminal can be specified. The wireless-network-information controller 107 may specify some identifier used in the wireless communication controller 104 such as an association ID as the identifier of the terminal. When the association ID is managed separately from the user information, the wireless-network-information controller 107 can acquire information associating the user name and the association ID from the wireless communication controller 104 or the wireless information storage 106 and use the acquired information.

(Second Embodiment: Summary)

As explained above, by adding the filtering function, it is possible to provide appropriate information to virtual machines operating independently from one another, according to this embodiment. This effect can also be obtained when the wireless communication device is providing a plurality of wireless networks.

(Third Embodiment: The Application Storage 109 and the Application Executer 108 are Separated from the Main Body of Wireless Communication Device)

(Configuration)

Figure 13:
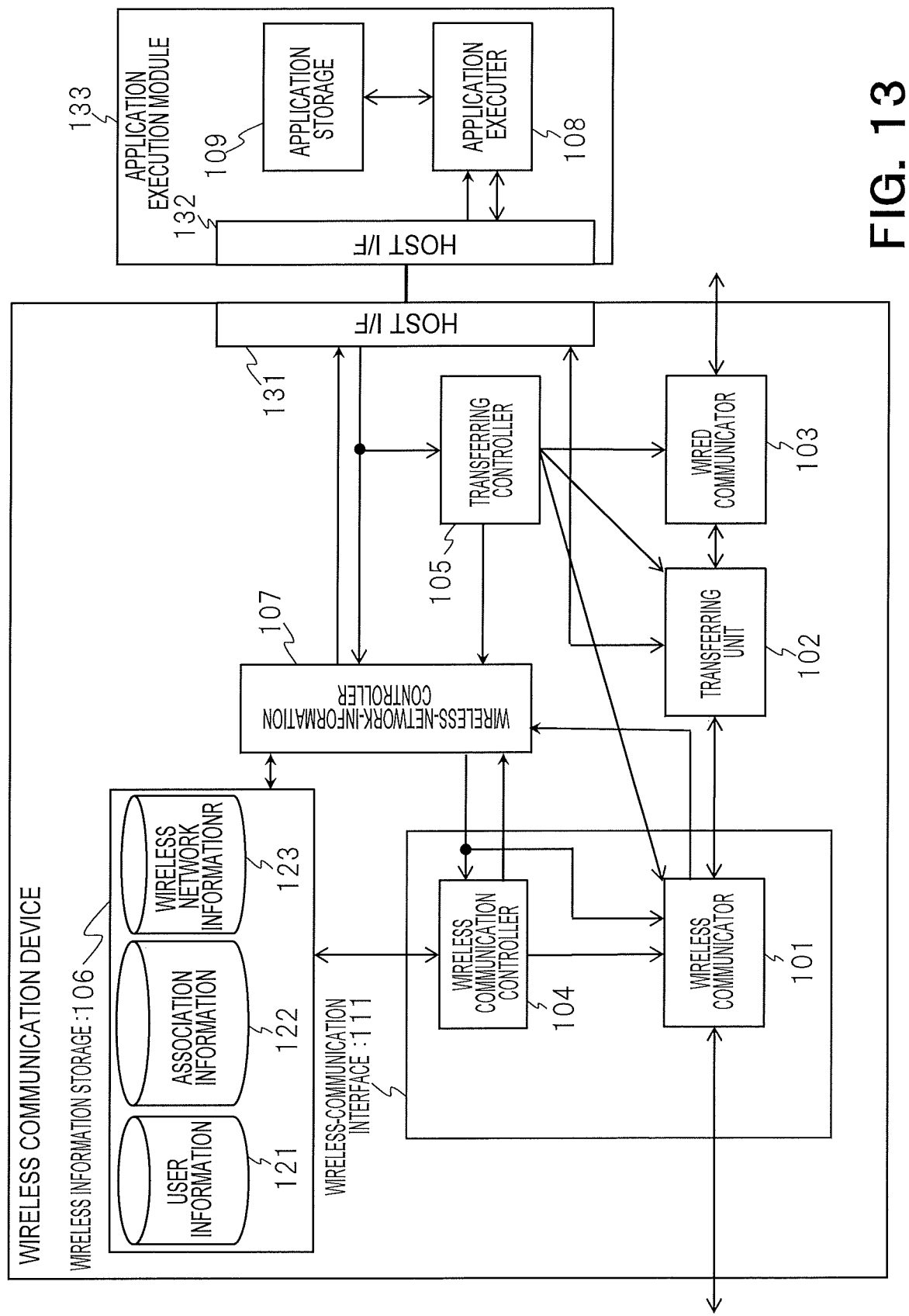
FIG. 13 is a block diagram according to a third embodiment.

In the first and second embodiments, the application executer 108 is integrated with the wireless communication device that provides the wireless network. The third embodiment is different from the first and second embodiments for; the application executer 108 is located in an external module (a computer device). A block diagram according to this embodiment is shown in FIG. 13.

The application executer 108 and the application storage 109 are removed from the wireless communication device (see FIG. 1) according to the first and second embodiments. Instead, a host I/F unit 131 is added. The host I/F unit 131 is an interface that connects a computer device (an application execution module) 133 to the wireless communication device. The host I/F unit 131 has a function of transferring, information, data, or the like between the wireless-network-information controller 107, the transferring controller 105, or the transferring unit 102 and the application executer 108 of the application execution module 133. Note that the host I/F unit 131 can enable data transfer or information transfer between components other than the three internal components and the application executer 108.

The application execution module 133 is an external module including the application executer 108, the application storage 109 and a host I/F unit 132. The executer 108 and the application storage 109 here correspond to the components in the first and second embodiments. The host I/F unit 132 is connected to the host I/F unit 131 in the side where the wireless communication device is located. The host I/F unit 132 has the same function as the function of the host I/F unit 131. Note that the application executer 108 and the application storage 109 have the same functions as the application executer 108 and the application storage 109 in the first or second embodiments.

(Sequence)

Most of the operation sequence in this embodiment is the same as the operation sequence in the first and second embodiments. The only difference in this embodiment is that the exchange of information or data between the application executer 108 and the wireless-network-information controller 107 is performed via the host I/F units 132 and 131.

(Additional Information Regarding the Configuration and Rules)

In FIG. 13, the application execution module 133 is connected to one host I/F unit 131 located in the wireless communication device side. However, the application execution module 133 may be connected to a plurality of host I/F units 131. In the case of the plurality of host I/F units 131, it is necessary to define identifiers (module IDs) for identifying application execution modules, so that it is possible to distinguish modules from the wireless communication device side. Communication processing between the wireless communication device and the modules is executed by the transferring unit 102. As in the first and second embodiments, the communication processing can be realized by "bridging" functions.

In addition to the rules explained in the second embodiment, a module ID may be included to distinguish the modules. Alternatively, request source IDs may be allocated to the virtual machines, so that the virtual machines can be identified uniquely among the modules.

(Third Embodiment: Summary)

As explained above, by separating the application storage 109 and the application executer 108 from the main body of the wireless communication device, it becomes easier to add the virtual machine functionality to the wireless communication device later, according to this embodiment. By including the interface (the host I/F unit) which uses information regarding the wireless network from outside of the network, the virtual machine function can use the information of the wireless network, without having a wireless network interface. Thus, it is possible to reduce the initial investment cost of the wireless communication device.

(Fourth Embodiment: when the Wireless Network Information is Saved in an External Server)

(Configuration)

Figure 14:
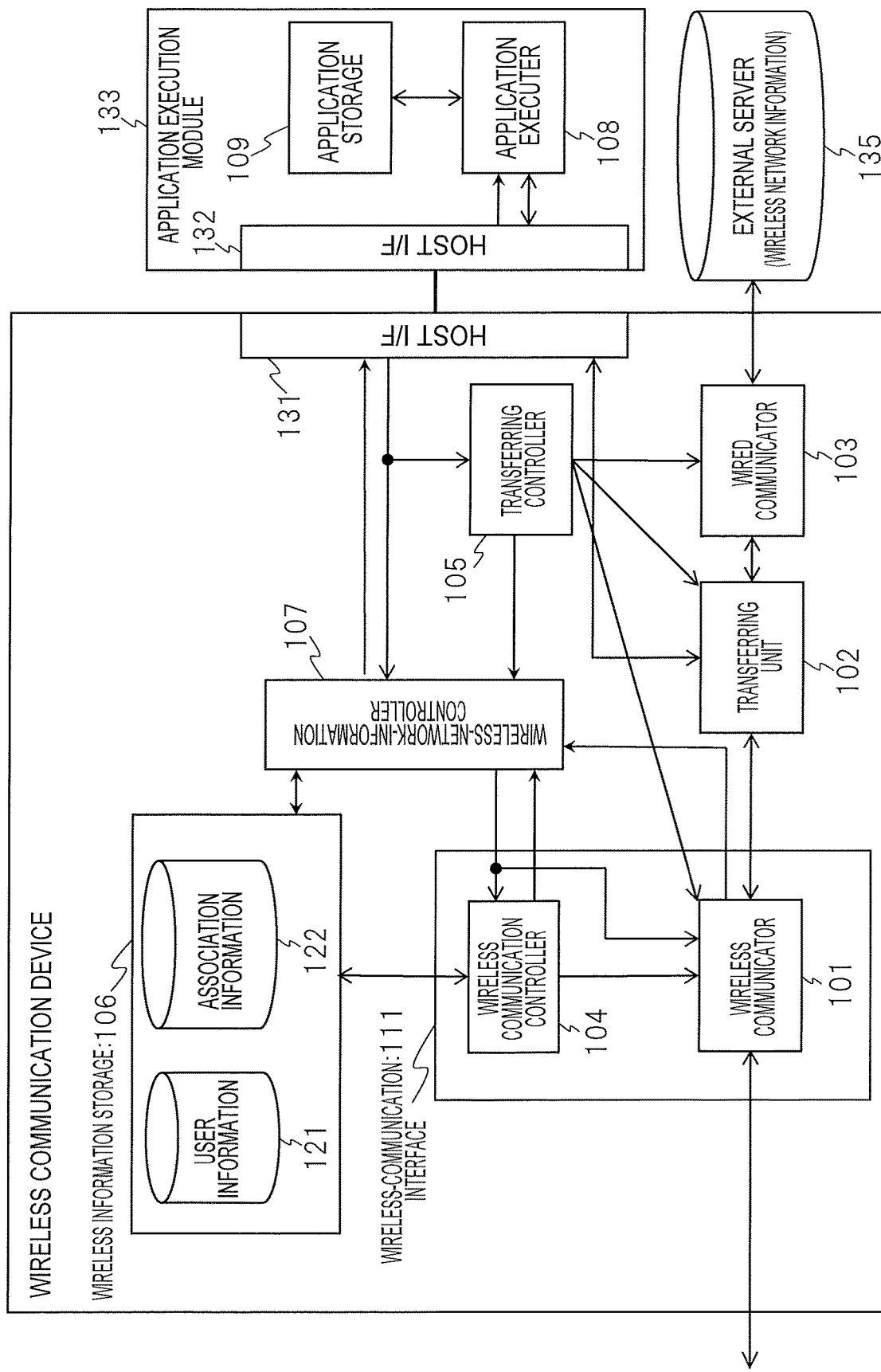
FIG. 14 is a block diagram according to a fourth embodiment.

In the first to third embodiments, the wireless network information is stored within the wireless communication device. However, in this embodiment, the wireless network information is saved in an external server (e.g., a cloud server, a wireless LAN access point management apparatus, or a network management/monitoring apparatus; hereinafter, external server). In FIG. 14, a block diagram according to this embodiment is shown.

An external server 135 is connected to a wireless communication device via a wired network. The external server 135 includes, as an example, a storage with greater capacity compared to the wireless information storage 106 in the wireless communication device. In the figure, the external server 135 is connected to one wireless communication device. However, actually, the external server 135 can be connected to a plurality of wireless communication devices. The external server 135 and the wireless communication device perform communication using general communication protocols such as TCP/IP. The wireless-network-information controller 107 or another component which is not shown (e.g., a CPU that controls the entire wireless communication device) can send the information acquired or generated by the wireless communication device to the external server 135. In FIG. 14, the function of the virtual machine is separated as the external module, which is the same as the third embodiment. However, a configuration with an external server connected to the wireless communication device of the first or second embodiment (see FIG. 1) is also possible.

(Sequence)

The operation sequence in this embodiment is similar to the operation sequences in the first to third embodiments explained above. The wireless-network-information controller 107 receives a request from the application executer 108 and executes processing that are required (e.g., acquisition of information, processing of information, saving information, and responding and filtering by application of rules). The difference in this embodiment is the fact that the wireless-network-information controller 107 refers to the external server 135 (if necessary, via another kind of software executed by the CPU) during the execution of processing. It is a matter of design and implementation whether the information in the wireless communicator 101 or transferring unit 102 is obtained directly or obtained from the external server 135. Thus, either way is possible to obtain information.

(Additional Information Regarding the Processing of the Rules)

Processing of the rules explained in the second embodiment is executed within the wireless communication device in principle. The wireless-network-information controller 107 acquires information from the external server 135 and performs the processing of the rules based on the information that is acquired. However, the external server 135 can execute the processing of the rules based on the request from the wireless communication device. In that case, the external server 135 also includes a function for specifying the wireless communication device that requested the rule processing. The external server 135 specifies the wireless communication device using an IP address or the like. The IP address is managed together with the rules.

Figure 15:
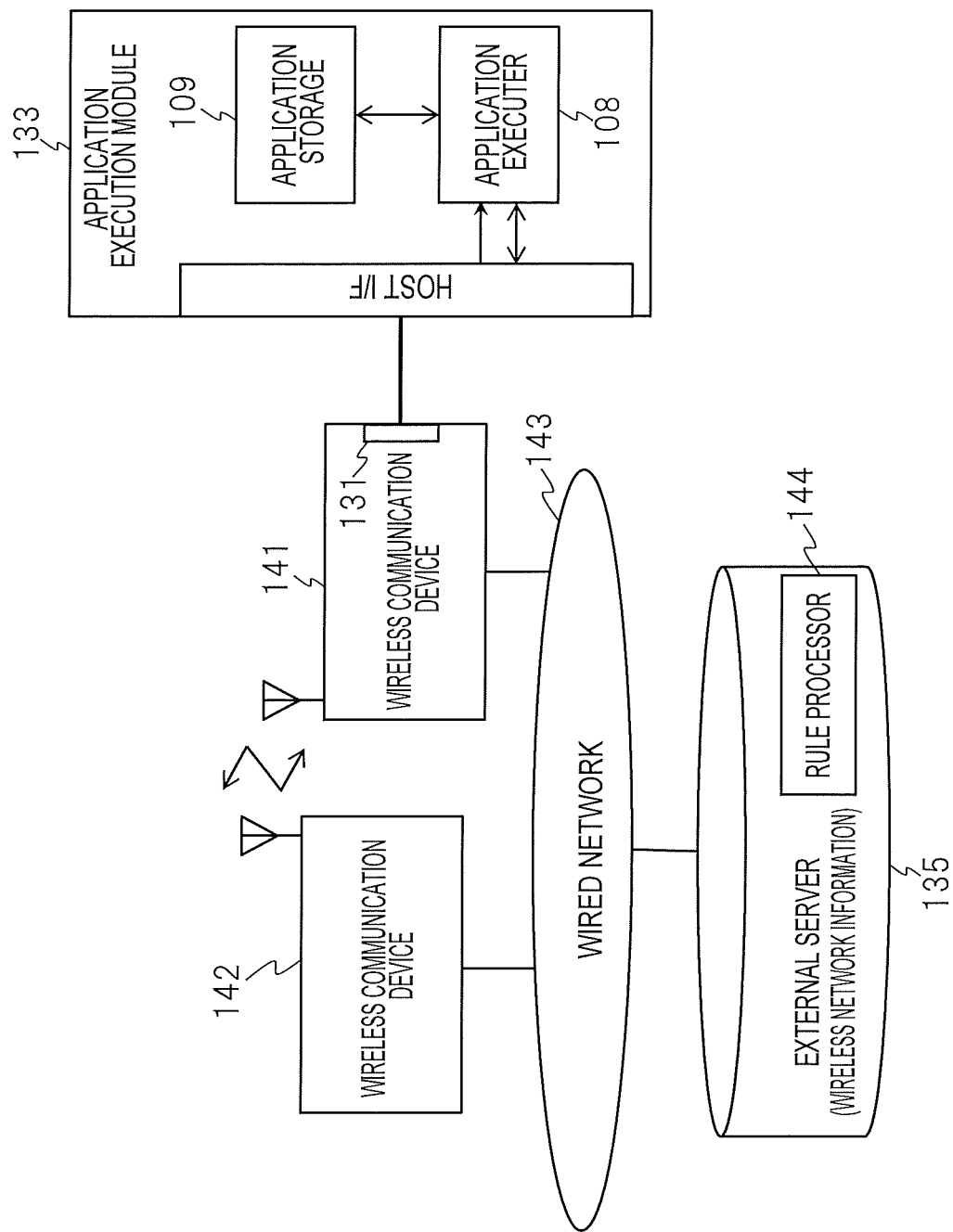
FIG. 15 is a diagram for explaining an operation example for acquiring information from a neighboring wireless communication device.

Since the external server 135 performs the processing of the rules as described above, the application executer 108 (the virtual machine) can operate by treating a neighboring wireless communication device as a virtual server. A figure that explains an example of the operation is shown in FIG. 15. Wireless communication devices 141 and 142 according to this embodiment are connected to a wired network 143. The external server 135 is connected to the wired network 143. The external server 135 includes a rule processor 144 that performs the processing of the rules. An application execution module may be connected externally to the wireless communication device 142. Storage space for the application and the application executer can be located in the wireless communication device 142. In this configuration, a virtual machine (and an application operating on the virtual machine) of the application executer 108 corresponding to the wireless communication device 141 can refer to the wireless network information acquired by a neighboring wireless communication device 142 and execute the application. The neighboring wireless communication device 142 can determine whether it will provide information or not using an identifier of the wireless communication device 141 which sent the information acquisition request and the external server 135. If it is determined that the provision of information is possible, the neighboring wireless communication device 142 sends the information to the wireless communication device 141. The wireless communication device 141 passes the received information to the virtual machine of the application executer 108. Note that it is also possible to make the neighboring wireless communication device 142 access the external server 135 to acquire information on the past and access the wireless information storage in the neighboring wireless communication device 142 to acquire present values.

(Fourth Embodiment: Summary)

As explained above, by using calculation resources of the external server 135 to process the wireless network information, more complicated calculation can be handled compared to cases when the wireless communication device with less calculation resources is used, according to this embodiment. Therefore, it is easy to calculate new statistical information involving complicated calculation. Since the external server 135 includes large-capacity storage, it is possible to perform saving and access of information for a long durations. Accesses to the wireless network information are centralized by the wireless-network-information controller 107 in the wireless communication device. Therefore, the application executer 108 does not need to query information from the external server 135 individually. Thus, it is possible to simplify the configuration of the application executer 108.

(Fifth Embodiment: when the Wireless Information Storage 106 in the Wireless Communication Device and the External Server are used Concurrently)

(Configuration)

Figure 16:
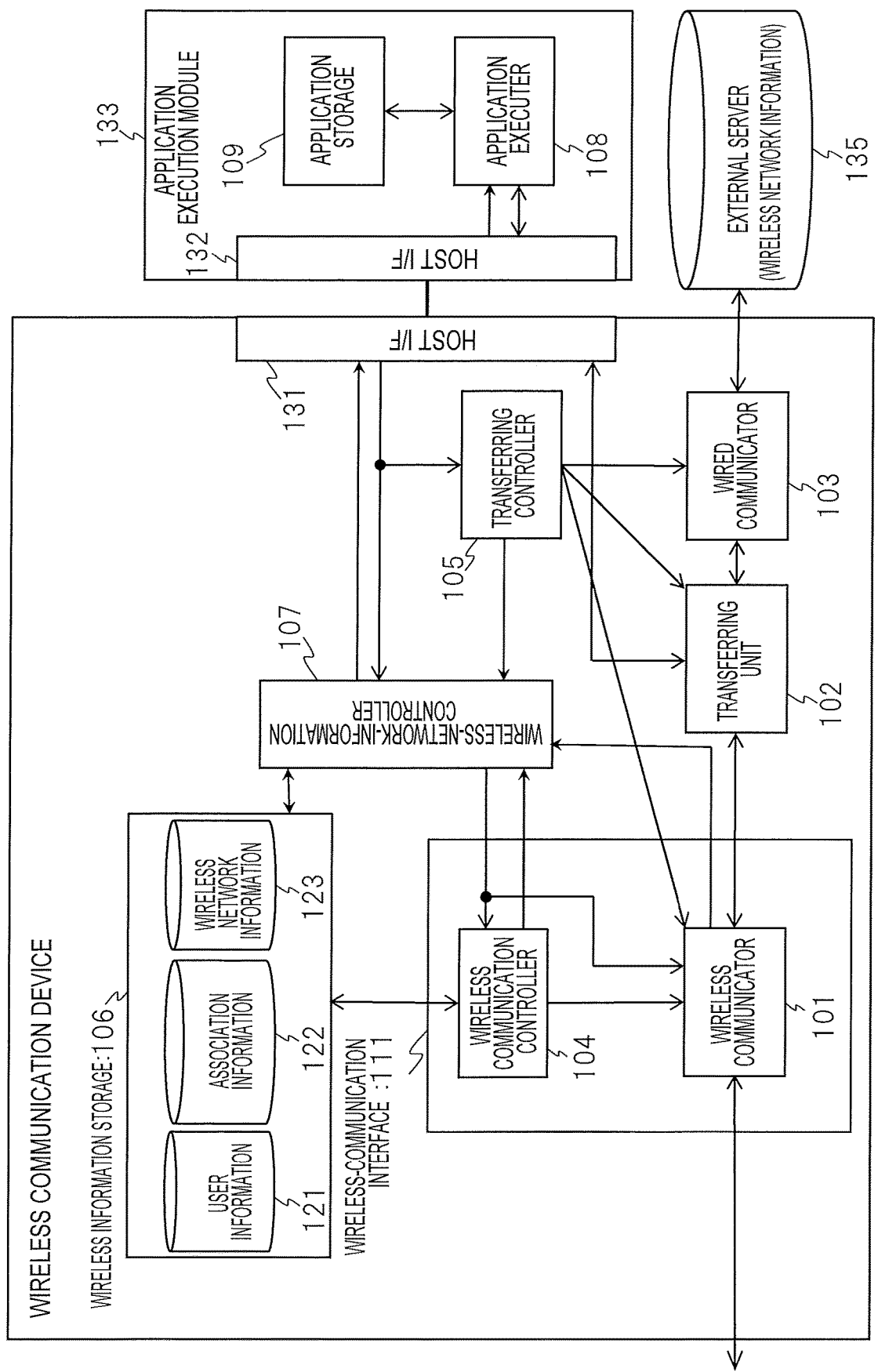
FIG. 16 is a block diagram according to a fifth embodiment.

This embodiment includes an external server, as in the fourth embodiment. Also, the wireless network information is saved in the wireless information storage 106 in the wireless communication device in this embodiment, as in the first to third embodiments. A block diagram according to this embodiment is shown in FIG. 16. The difference of FIG. 16 compared to FIG. 14 in that the wireless network information is also saved in the wireless information storage 106. Note that only one external server 135 is shown but a plurality of external servers 135 can be used. The same applies to the fourth embodiment.

The distinction of information stored in the wireless information storage 106 and the external server 135 can follow the examples described below. "Inside" indicates the wireless information storage 106 and "outside" indicates the external server 135.

EXAMPLE 1

Distinction by the Age of Information

Inside: The most recent value
Outside: Past values, a statistical values based on past values

EXAMPLE 2

Distinction According to the Type of Information

Inside: RSSIs (a predetermined number samples from the latest values) of terminals
Outside: Other information

EXAMPLE 3

Distinction by Presence and Absence of Information Requests

Inside: Information requested from the application executer 108 (information likely to be requested in the future as well)
Outside: Other information The wireless-network-information controller 107 can read out the information required based on the distinction described above, after confirming the presence or the absence of information in the location ("inside" or "outside") and send a response based on the information that is read to the requester.

(Overall Supplementation)

There are roughly two management methods for the wireless communication device. One method is to do configuration directly on the wireless communication device itself. Another method is to use some management apparatus and configure the apparatus to reflect the configured settings to the wireless communication device. In the latter case, it is possible to connect the management apparatus to the same network as the wireless communication device or prepare the management apparatus in remote locations such as cloud. In some cases, the wireless communication device itself can be configured to act as the management apparatus, depending on situations. Since the wireless communication device according to the embodiment of the present invention does not depend on management methods, the wireless communication device can be applied without change for all of these cases. Note that the management apparatus can include the functions of the external servers explained in the fourth embodiment and the fifth embodiment.

In the explanation above, the virtual machine emulated the entire hardware. However, the present invention does not depend on specific methods for realizing a virtual environment. As in the embodiments explained above, the virtual machine can be created by complete virtualization or quasi-virtualization.

A scheme that make coexistence of a plurality of environments possible by separating the computer resources of a physical computer according to some method or separation of space (the method or the space is referred to as container) can be used. The container operates on a container environment executed in a processor while the virtual machine operates on a virtual computing environment executed in a processor. In this case of using the container, the methods described in the embodiments explained above can be used both in the separated environment (container) and the outside of the separated environment (container).

The terms used in this embodiment should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" may indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. These can be read by a processor. If the processor performs reads, writes or both reads and writes to the memory, the memory can be considered as communicating electrically with the processor. The memory can be integrated with the processor. In such cases as well, the memory can be considered as communicating electrically with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a wireless-communication interface configured to communicate with one or more terminal using a wireless network; and
   a wireless-network-information controller configured to
      receive a request for wireless network information, which is information based on wireless communication with the terminal from a virtual machine operating on a virtual computing environment executed in a processor in the wireless communication device or a container operating on a container environment executed in the processor,
      acquire the wireless network information from the wireless-communication interface based on the request or read out the wireless network information from information given in advance, and transmit the wireless network information to the virtual machine or the container, wherein the virtual machine or the container includes a first application for performing processing with the wireless network information, in the processor, a second application is executed in an separate environment from the virtual computing environment or from the container environment, the wireless-network-information controller receives the request from the second application and sends the wireless network information to the second application, and the second application sends the request to the wireless-network-information controller upon receiving an instruction of the first application from the virtual machine via the virtual computing environment or from the container and passes the wireless network information received from the wireless-network-information controller to the first application via the virtual computing environment or the container environment.

2. The wireless communication device according to claim 1, wherein the virtual machine or the container further includes a virtual device for communicating with the wireless-network-information controller, the wireless-network-information controller receives the request from the virtual device via the virtual computing environment or from the container environment and sends the wireless network information to the virtual device, and the virtual device sends, according to an instruction of the first application, the request to the wireless-network-information controller via the virtual computing environment or the container environment and passes the wireless network information received from the wireless-network-information controller to the first application via the virtual computing environment or the container environment.

3. The wireless communication device according to claim 1, wherein the request includes an identifier of the wireless network information, and the wireless-network-information controller, when the request matches any one of information identifiers in a plurality of rules which includes the information identifiers and action identifiers, executes an operation corresponding to the action identifier in the matching rule to obtain the wireless network information.

4. The wireless communication device according to claim 3, wherein the rule includes an identifier of the virtual machine or the container, and the request includes an identifier of the virtual machine or the container which has sent the request.

5. The wireless communication device according to claim 3, wherein the rule includes a condition requirement for executing the operation corresponding to the action identifier, and when the terminal related to the request satisfies the condition requirement, the wireless-network-information controller executes the operation corresponding to the action identifier.

6. The wireless communication device according to claim 3, wherein the rule includes a condition concerning communication environment in a terminal for which the operation corresponding to the action identifier is executed, and the wireless-network-information controller specifies the rule having the condition matched with information requested by the request.

7. The wireless communication device according to claim 1, further comprising a storage that stores predetermined information, wherein the wireless-network-information controller reads out the wireless network information from the storage and saves the acquired wireless network information in the storage.

8. The wireless communication device according to claim 7, wherein predetermined information is saved in an external server, and the wireless-network-information controller reads out the wireless network information from the external server and saves the acquired wireless network information in the external server.

9. The wireless communication device according to claim 7, further comprising a storage configured to store a part of predetermined information, wherein another part of the predetermined information is stored in an external server, and the wireless-network-information controller reads out the wireless network information from at least one of the storage and the external server.

10. The wireless communication device according to claim 1, wherein the wireless network information includes at least one of a quality of communication with the terminal and a condition of radio wave used in communication with the terminal.

11. A computer device provided in a wireless communication device that communicates with one or more terminals, comprising:

a first application configured to execute processing with a wireless network information which is information based on wireless communication with a terminal that communicates with the wireless communication device, the first application being provided by a virtual machine operating on a virtual computing environment executed in a processor or by a container environment executed in the processor; and an interface configured to issue a request for the wireless network information to a wireless-network-information controller in the wireless communication device based on an instruction from the first application, and receives a response including the wireless network information corresponding to the request from the wireless-network-information controller, and provides the wireless network information included in the response to the first application, wherein the interface includes a second application configured to operate in an environment separate from the virtual computing environment or from the container environment, and the second application is configured to issue the request to the wireless communication device when an instruction from the first application via the virtual computing environment or the container environment is received and to provides the wireless network information received from the wireless communication device to the first application via the virtual computing environment or the container environment.

12. The computer device according to claim 11, wherein
the interface further includes a virtual device provided by
the virtual machine environment or by the container environment, and
the virtual device issues the request to the wireless communication device when an instruction from the first application is received, and provides the response received from the wireless communication device to the first application.

13. The computer device according to claim 11, wherein the wireless network information includes at least one of a quality of communication with the terminal and a condition of radio wave used in communication with the terminal.

14. A wireless communication method executed in a wireless communication device comprising:
communicating with one or more terminals via a wireless network;
receiving, a request for wireless network information which is information based on wireless communication with the terminal from a virtual machine operating on a virtual computing environment executed in a processor in the wireless communication device or a container operating on a container environment executed in the processor;
acquiring the wireless network information from a wireless-communication interface based on the request or by reading out the wireless network information from information given in advance; and
sending the wireless network information to the virtual machine or the container, wherein
the virtual machine or the container includes a first application for performing processing with the wireless network information,
in the processor, executing a second application in a separate environment from the virtual computing environment or from the container environment,
the method further comprising:
receiving the request from the second application and sending the wireless network information to the second application, and
sending, by the second application, the request upon receiving an instruction of the first application from the virtual machine via the virtual computing environment or from the container and passes the wireless network information to the first application via the virtual computing environment or the container environment.

15. The wireless communication method according to claim 14, wherein the wireless network information includes at least one of a quality of communication with the terminal and a condition of radio wave used in communication with the terminal.

16. An information processing method executed in a computer device provided in a wireless communication device, comprising:
generating by a first application a request for wireless network information, the first application being provided by a virtual machine operating on a virtual computing environment executed in a processor or a container operating on a container environment executed in the processor, and being configured to perform processing with the wireless network information which is information based on wireless communication with a terminal that communicates with the wireless communication device;
sending the request to a wireless-network-information controller in the wireless communication device via an interface provided in the virtual machine or the container and receiving a response corresponding to the request that includes the wireless network information via the interface from the wireless-network-information controller; and
providing the wireless network information included in the response to the first application, wherein
the interface includes a second application configured to operate in an environment separate from the virtual computing environment or from the container environment,
the method further comprising:
issuing, by the second application, the request to the wireless communication device when an instruction from the first application via the virtual computing environment or the container environment is received, and
providing, by the second application, the wireless network information received from the wireless communication device to the first application via the virtual computing environment or the container environment.

17. The information processing method according to claim 16, wherein the wireless network information includes at least one of a quality of communication with the terminal and a condition of radio wave used in communication with the terminal.

* * * * *